(12) United States Patent  
Yamada et al.

(10) Patent No.: US 8,384,013 B2  
(45) Date of Patent: Feb. 26, 2013

(54) OPTICAL FILTER

(75) Inventors: Tomohiro Yamada, Yokohama (JP); Ryo Kuroda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/279,119

(22) Filed: Oct. 21, 2011

(65) Prior Publication Data

US 2012/0038995 A1 Feb. 16, 2012

Related U.S. Application Data

(63) Continuation of application No. 12/474,086, filed on May 28, 2009, now Pat. No. 8,067,723.

(30) Foreign Application Priority Data

May 30, 2008 (JP) .................................. 2008-142939

(51) Int. Cl.  
*G01J 3/50* (2006.01)

(52) U.S. Cl. ...................................................... 250/226

(58) Field of Classification Search .................. 250/226, 250/216, 208.1; 257/9–23, 30, 49, 734; 438/759–798, 650–666  
See application file for complete search history.

(56) References Cited

FOREIGN PATENT DOCUMENTS

| JP | 2007-501391 A | 1/2007 |
| KR | 10-2006-0130543 A | 12/2006 |
| WO | 2006/102275 A2 | 9/2006 |
| WO | 2007/118895 A1 | 10/2007 |

*Primary Examiner* — Seung C Sohn  
(74) *Attorney, Agent, or Firm* — Canon U.S.A., Inc., IP Division

(57) ABSTRACT

An optical filter includes a light-shielding conductive layer provided with a plurality of apertures on a substrate surface that selectively transmits light of a first wavelength, and a dielectric layer in contact with the conductive layer. A size of the apertures is a size equal to or less than the first wavelength, and a ratio of a surface area of the conductive layer to a surface area of the substrate surface is within a range of equal to or greater than 36% and equal to or less than 74%. A transmissivity of the first wavelength is increased by surface plasmons induced in the apertures by light falling on the conductive layer.

18 Claims, 22 Drawing Sheets

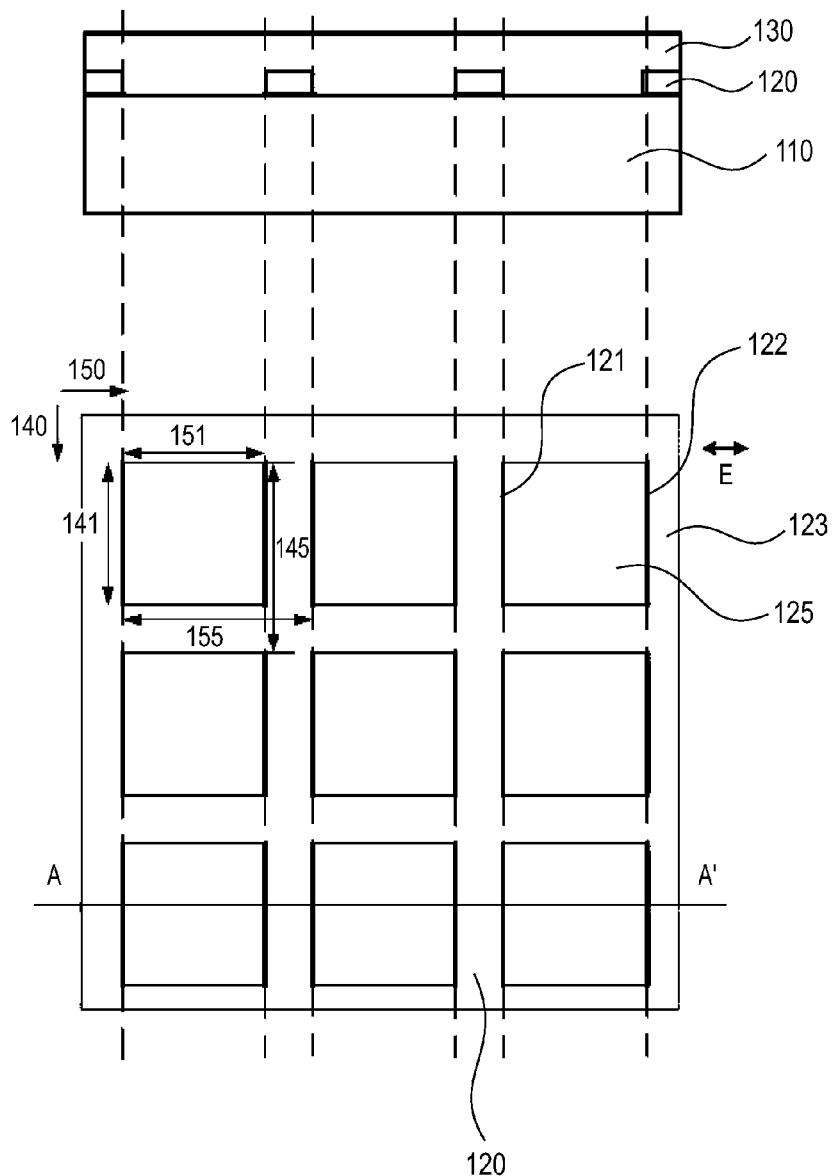

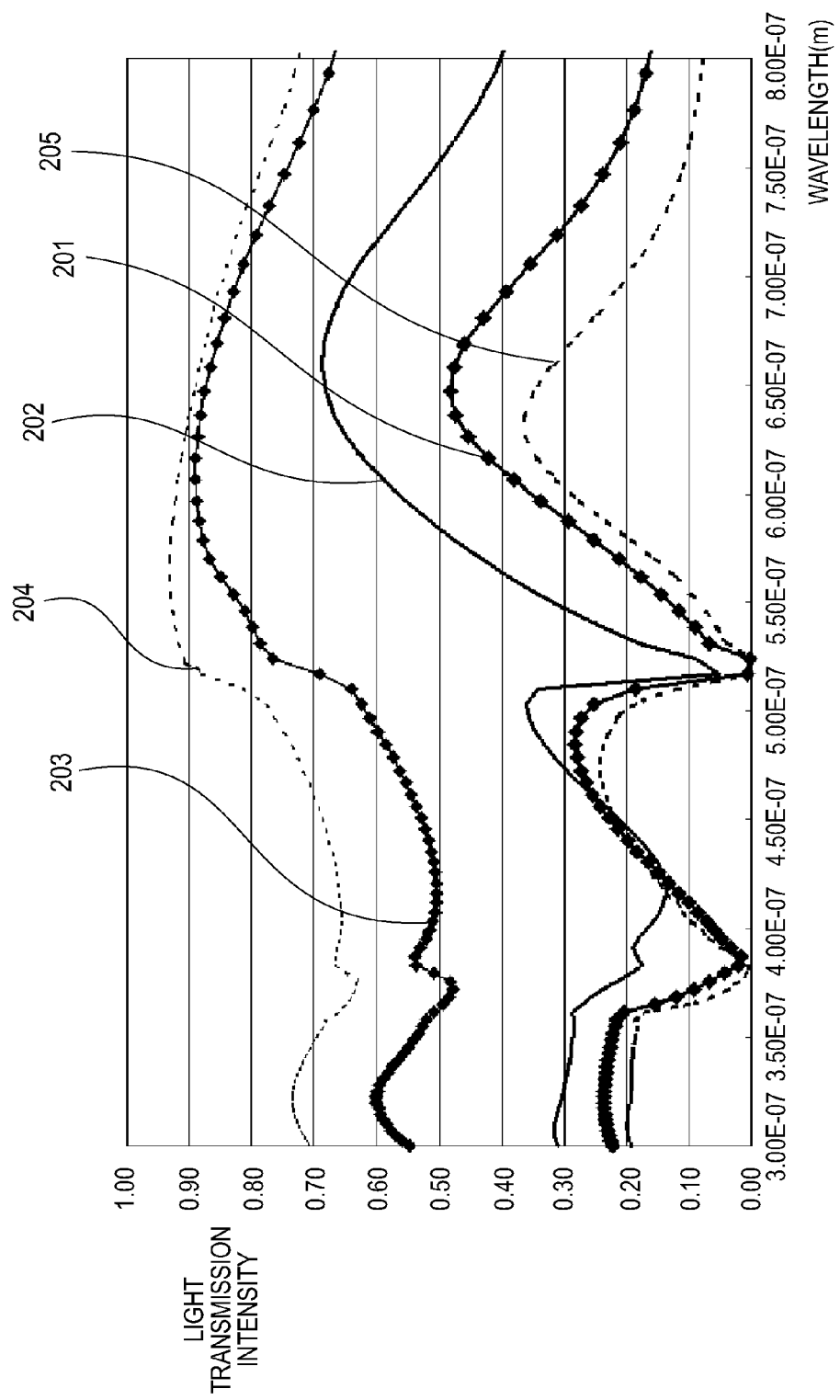

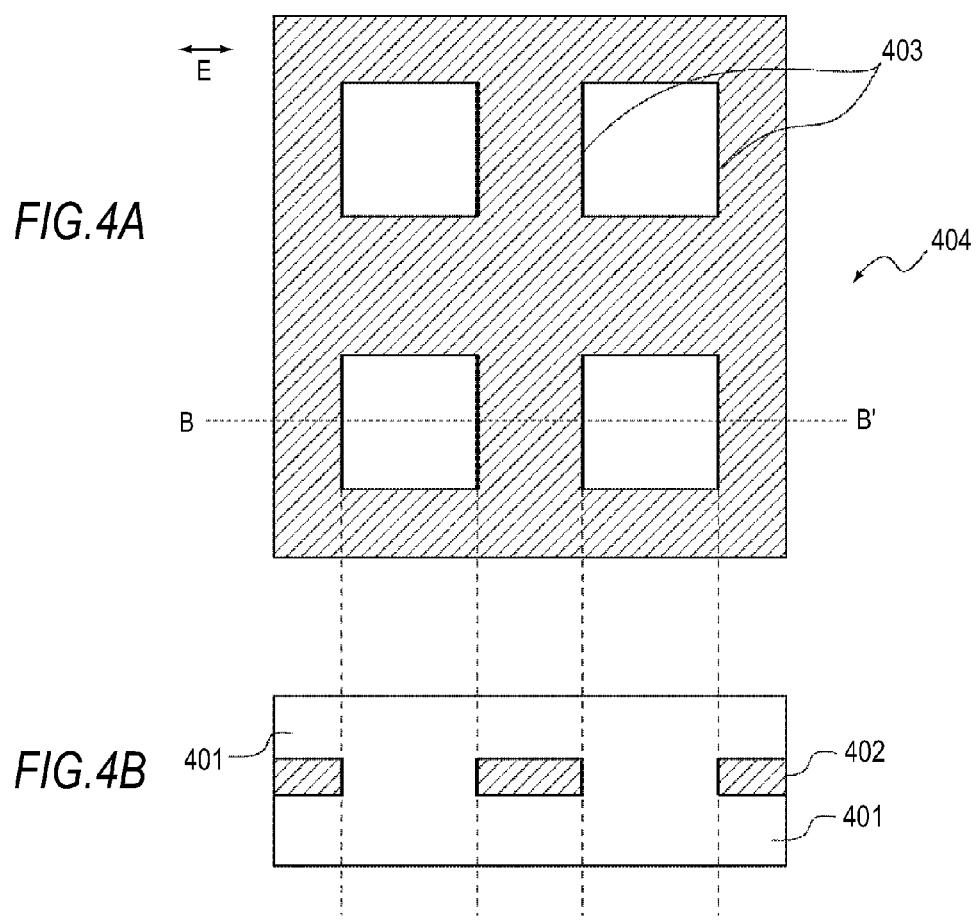

OPTICAL FILTER

CROSS REFERENCE TO RELATED APPLICATIONS

This application is a Continuation of U.S. patent application Ser. No. 12/474,086 filed May 28, 2009, which claims priority to Japanese Patent Application No. 2008-142939 filed May 30, 2008, each of which are hereby incorporated by reference herein in their entireties.

BACKGROUND OF THE INVENTION

1. Field of the Invention

The invention relates to an optical filter that uses localized plasmons.

2. Description of the Related Art

A hole-type optical filter in which apertures are arranged periodically in a thin metal film and wavelength selection is performed using surface plasmons is described in U.S. Pat. No. 5,973,316 and Nature, Vol. 424, 14, Aug. 2003.

The transmissivity of a thin metal film having an aperture diameter of a size equal to or less than a light wavelength has been considered to be less than approximately 1%, with the specific value depending on the film thickness.

The description of U.S. Pat. No. 5,973,316 suggests that the transmissivity can be increased to a certain extent by using surface plasmons of the thin metal film surface.

Furthermore, Nature, Vol. 424 (P824-830), 14, Aug. 2003 describes the possibility of obtaining a RGB transmission spectrum as a hole-type optical filter using surface plasmons.

In a conventional optical filter using a thin metal film, light transmissivity is typically about several percents. However, in an optical filter in which transmissivity is not that high, an incident light intensity sufficient to obtain a desired transmitted light intensity may be high. As a result, for example, the thin metal film may be heated as the incident light intensity rises, and structural changes may occur in the thin metal film. This can make it impossible to obtain the desired designed optical characteristics.

U.S. Pat. No. 5,973,316 discloses a feature for increasing the transmissivity by using a thin metal film structural body in which periodic apertures are provided in a thin metal film, and matching the arrangement period of the apertures with the wavelength of surface plasmons propagating in the thin metal film surface.

However, in the invention disclosed in U.S. Pat. No. 5,973,316, the aperture arrangement period generally has to be matched with the plasmon wavelength, and thus there is little freedom in designing optical characteristics. For example, it can be difficult to design an element having desired optical characteristics in a wide-zone wavelength range such as the entire visible range.

Nature, Vol. 424, 14, Aug. 2003 discloses the possibility of obtaining a RGB transmission spectrum as a hole-type optical filter, but investigations for increasing transmissivity and providing stable characteristics for such optical filters have not been conducted.

Accordingly, in the application of filters such as those described above, the stability of characteristics and endurance, in addition to optical characteristics such as transmissivity and wavelength zone, are in need of improvement.

SUMMARY OF THE INVENTION

According to an aspect of the present invention, an optical filter includes a light-shielding conductive layer provided with a plurality of apertures on a substrate surface that selectively transmits light of a first wavelength, and a dielectric layer in contact with the conductive layer. A size of the apertures is a size equal to or less than the first wavelength, and a ratio of a surface area of the conductive layer to a surface area of the substrate surface is within a range of equal to or greater than 36% and equal to or less than 74%. A transmissivity of the first wavelength is increased by surface plasmons induced in the apertures by light falling on the conductive layer. According to another aspect of the present invention, an optical filter includes a substrate, a conductive layer with a plurality of apertures provided periodically on the substrate, and a dielectric layer in which the conductive layer is embedded. A size of the apertures is a size equal to or less than a resonance wavelength of the plasmon resonance so that localized surface plasmons are generated by a visible light falling thereon, and a maximum value of transmissivity at the resonance wavelength of the filter is equal to or greater than approximately 50%.

Further features of the present invention will become apparent from the following description of exemplary embodiments with reference to the attached drawings.

BRIEF DESCRIPTION OF THE DRAWINGS

FIGS. 1A and 1B are schematic diagrams illustrating an example of the invention;

FIG. 2 is a graph illustrating the dependence of a light transmission intensity on a wavelength;

FIGS. 4A and 4B are schematic diagrams illustrating an example of the invention;

DESCRIPTION OF THE EMBODIMENTS

The inventors have studied an optical filter having a structure in which at least two metal/dielectric interfaces are disposed opposite each other.

In a case where a smooth metal surface is in contact with a dielectric, a surface plasmon resonance (SPR) can be generated at the interface thereof. Furthermore, even in a case where the metal surface is not smooth, for example, in a metal nanostructure such as a metal fine particle or metal aperture, such as in a structure of a size of equal to or less than about a light wavelength, a localized surface plasmon resonance (LSPR) can be generated.

A plasmon is a collective oscillation of free electrons inside a metal or on the surface thereof that is induced by an external electric field such as light. Since electrons bear an electric charge, the oscillation of electrons produces polarization determined by the density distribution of the free electrons. A phenomenon in which this polarization couples with an electromagnetic field is called a plasmon resonance.

A resonance phenomenon of light and plasma oscillations of free electrons generated in a metal nanostructure is called a localized surface plasmon resonance (LSPR).

Thus, collective oscillations of free electrons in a metal nanostructure are induced by an external electric field such as light, these oscillations create an electron density distribution and polarization resulting therefrom, and an electromagnetic field that is localized in the vicinity of the metal nanostructure is generated.

The generated LSPR absorbs and scatters light of a specific frequency with an especially high intensity. Therefore, the transmissivity and reflectivity generated thereby depend on the wavelength.

The LSPR can be demonstrated by a metal structure with a thickness of equal to or greater than several nanometers.

A principle according to aspects of the invention will be described below using a simple structure.

Figure 16A:
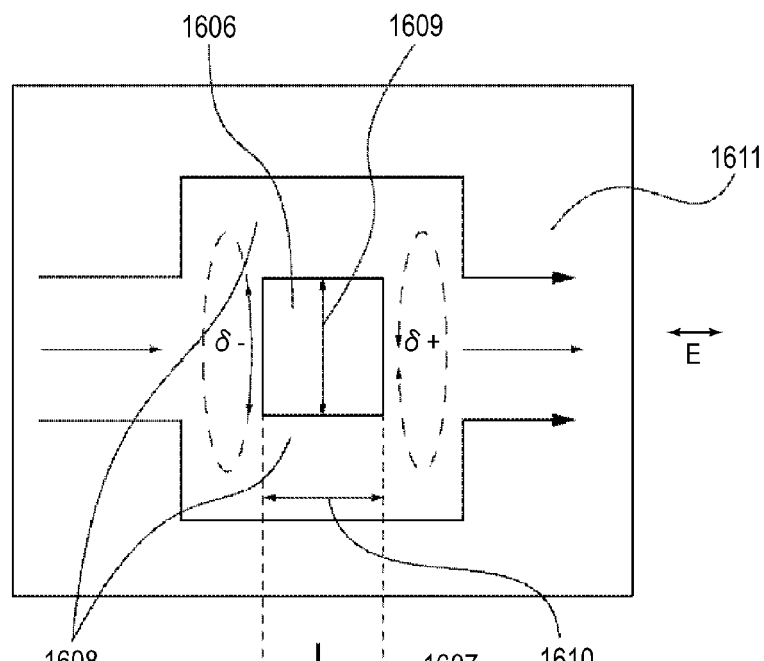
FIGS. 16A to 16C are schematic diagrams illustrating a principle of the invention.
Figure 16B:
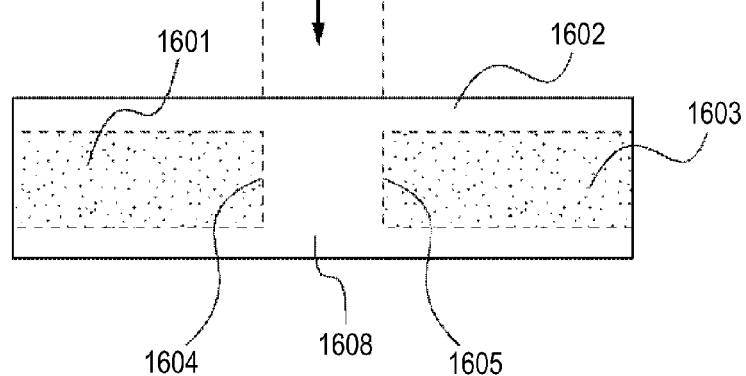
Figure 16C:
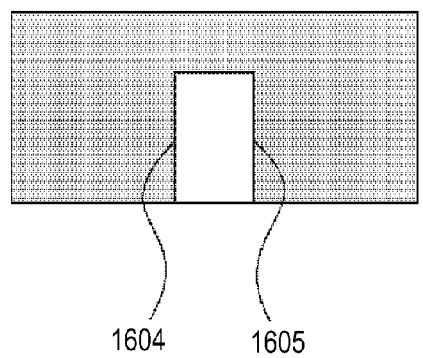

Let us consider a thin metal film structural body 1611 in which conductor/dielectric interfaces are parallel and face each other, as shown in FIGS. 16A to 16C. FIG. 16A is a view from the light incidence side, and FIG. 16B is a side view. The conductor will be explained hereinbelow by considering a metal. In the figure, an interface 1604 and an interface 1605 formed by a metal member 1601, a dielectric member 1602, and a metal member 1603 are parallel and face each other. These two interfaces form an aperture 1606.

In the explanation above, a filter using a shape shown in FIG. 16A is mainly considered, but the filter in accordance with the invention is not limited to this shape, and optical characteristics of the optical filter in accordance with aspects of the invention basically can be demonstrated with any shape in which interfaces are disposed opposite each other, as shown for example in FIG. 16C.

This is believed to be because, as will be described in greater detail hereinbelow, plasmons are generated that are localized on the interface 1604 and interface 1605 of the metal member (conductive layer) and dielectric member (dielectric layer).

Without being limited to any particular theory, it is believed that when an incident light 1607 having a polarization (i.e., electric field) component shown in the figure falls on the aperture 1606, free electrons are moved and distributed, as shown by arrows in the figure, in the aperture 1606 and circumference thereof, and a charge density distribution appears in the vicinity of the aperture 1606. Coupling of the charge density distribution and electromagnetic field is a localized plasmon.

Due to the involvement of free electrons at the periphery of aperture 1606 or scattering at the interface end portions, the localized plasmons generate charge density distribution at the aperture edges.

For example, in a case of an optical filter having an aperture shape, localized plasmons induced in the apertures are generated as a standing wave of a charge density wave that is reflected form an end portion 1608 of the aperture 1606 shown in FIGS. 16A to 16C. As a result, the integral multiple of half-wavelengths of plasmons induced in this portion is approximately equal to a width (length) 1609 of the interface.

In a case where plasmons are induced at such an interface, even when the spacing 1610 between the opposing interfaces is so small that the visible light cannot be transmitted, the energy of this light propagates to the outgoing side of the thin metal film structural body 1611 under the effect of the localized plasmons.

Thus, according to one aspect of the invention, predetermined optical characteristics may be demonstrated by using localized plasmons induced in a nanosize structural body (e.g., at opposing smooth interfaces), rather than by general surface plasmons propagating along a thin metal film surface.

Aspects of the invention may therefore use localized plasmons that are localized and induced in interface portions and apertures formed by the interfaces.

Localized plasmons are localized in the in-plane direction and also the thickness direction of a thin metal film, and where the localized plasmons are induced at the end surface on the incidence side of the aperture, the energy of localized plasmons propagates to the end surface on the outgoing side of the aperture and is re-emitted in the free space.

According to one aspect of the invention, optical characteristics of an optical filter in which localized plasmons are induced may originate in the shape and disposition of the nanostructure that induces the localized plasmons. Therefore, the transmission wavelength and transmissivity may be controlled by accurately designing the shape and disposition of the nanostructure.

Furthermore, the optical filter in accordance with aspects of the invention can demonstrate the functions thereof even with one set of opposing interfaces. This is because, as described hereinabove, in optical characteristics of the optical filter in accordance with the invention, the frequency of localized plasmons induced at the interfaces or the wavelength corresponding to the frequency is at least partially determined by the shape of the opposing interfaces.

Figure 3A:
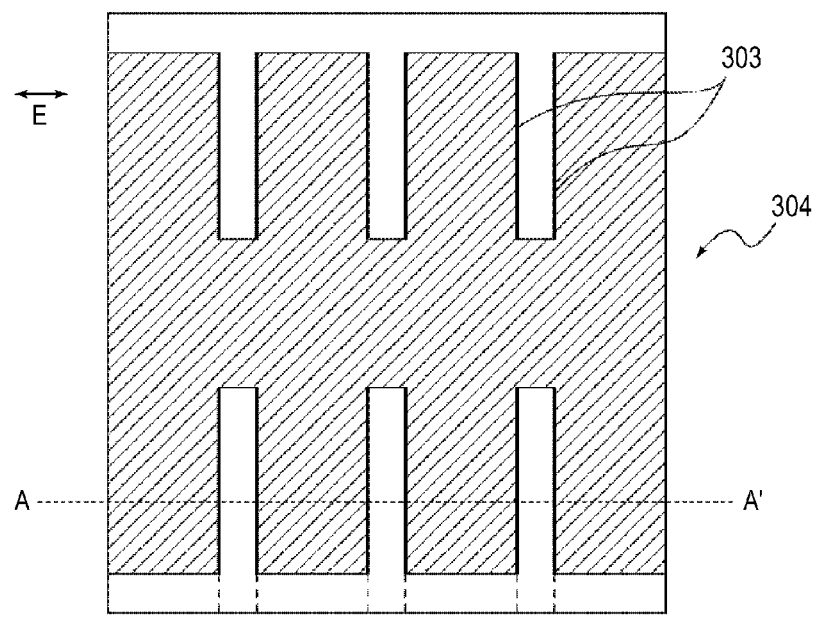
FIGS. 3A and 3B are schematic diagrams illustrating an example of the invention.
Figure 3B:
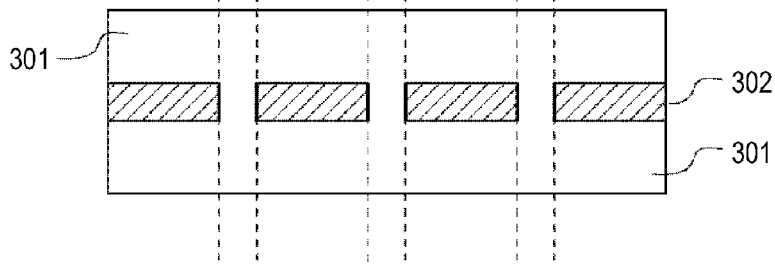

FIGS. 3A and 3B are schematic diagrams of an optical filter 304 in which a thin metal film structural body 302 that has metal/dielectric interfaces 303 of the same width and length are disposed in a dielectric substrate 301.

In FIGS. 3A and 3B, the optical filter is constituted by a periodic arrangement of the metal/dielectric interfaces 303. A cross-section A-A' in FIG. 3A is shown in FIG. 3B.

Likewise, an example of an optical filter of a configuration different from that shown in FIGS. 3A and 3B are shown in FIGS. 4A and 4B.

FIGS. 4A and 4B are schematic diagrams of an optical filter 404 in which a thin metal film structural body 402 that has metal/dielectric interfaces 403 of the same width and length are disposed in a dielectric substrate 401.

In FIGS. 4A and 4B, the metal/dielectric interfaces form parts of apertures that function as windows opened in a metal layer (conductive layer) that is a light-shielding member.

In FIGS. 4A and 4B, the optical filter comprises a periodic arrangement of the apertures. A cross-section B-B' in FIG. 4A is shown in FIG. 4B.

Because the width (length) of the metal/dielectric interface at least partially determines the wavelength of induced plasmons, it can play an important role in determining the optical characteristics (such as the transmission wavelength) of the filter.

Furthermore, while the transmissivity of a filter having the opposing metal/dielectric interface may be affected by a variety of factors, generally the propagation loss decreases as the plasmons induced at both interfaces are coupled and the electromagnetic field distribution is drawn out from the metal side to the dielectric side.

Therefore, a certain decrease in the distance between the interfaces may be beneficial for decreasing the propagation loss. However, too small a distance between the interfaces may be undesirable because propagation loss in a case where the aperture is viewed as a plasmon waveguide increases.

Accordingly, a surface occupancy (filling factor; referred to hereinbelow as FF) is represented by Sa/S, where Sa stands for a surface occupied by a light-shielding portion in the optical filter with a surface S. Thus, the filling factor represents a ratio of surface area of the light shielding portion (conductive layer) to a surface area of the substrate surface.

Furthermore, even when the apertures have an array-like arrangement, the FF can affect the transmissivity.

In the description of U.S. Pat. No. 5,973,316 mentioned above, surface plasmons may be actively energized by matching the aperture period of a thin metal film with a wavelength of surface plasmons that propagate over a long distance along the thin metal film surface. By contrast, in the optical filter in accordance with aspects of the invention, optical characteristics may be demonstrated by inducing localized plasmons inside the apertures. Furthermore, in certain instances inducing surface plasmons on the thin metal film surface, for example without inducing localized plasmons inside the apertures, may be undesirable.

This is because a loss inevitably occurs, as described in U.S. Pat. No. 5,973,316, when surface plasmons are induced and they propagate over the thin metal film surface.

Furthermore, because the excitation conditions of surface plasmons on a thin metal film surface are different from the excitation conditions of localized plasmons present inside an aperture, a loss may also occur when the surface plasmons present on the thin metal film surface are coupled with the localized plasmons located inside the aperture. This is one more reason why transmissivity may decrease with the generation of surface plasmons.

However, in the optical filter in accordance with aspects of the invention, localized plasmons may be directly induced substantially and even entirely without converting the incident light into surface plasmons. Furthermore, a relatively high transmissivity can be realized because coupling the localized plasmons again with the propagating light contributes to increase in transmissivity.

According to one aspect of the invention, a configuration in which the FF of the thin metal film in all the elements is relatively small can be considered as a configuration of an optical filter with a relatively high transmissivity.

Furthermore, because localized plasmons are mainly induced at the edge of apertures formed in a thin metal film, part of the energy of the localized plasmons propagates to the thin metal film surface surrounding the apertures and is lost as a thermal energy inside the thin metal film. In a case where the FF is large, a thin metal film portion (light-shielding portion) surrounding the aperture (light-transmitting portion) is much larger than the aperture area, and the thin metal film portion is present at a distance larger than the aperture diameter in any direction around the aperture.

As a result, the energy of localized plasmons induced in the aperture may easily induce a charge density distribution in the thin metal film portion surrounding the aperture, and may easily cause the above-described energy loss.

These effects may be manifested, for example, in a case where the arrangement period of apertures matches the wavelength of surface plasmons, as in the filter described in the aforementioned U.S. Pat. No. 5,973,316.

By contrast, in a case where the FF is small, the shape of the thin metal film portion surrounding the aperture may be that of a fine metal wire, rather than of a flat sheet.

A mode number of surface plasmons induced on the surface of a wire-shaped metal may be less than that of the thin metal film structure of the above-described flat sheet shape, because of structural anisotropy of the wire-like metal.

As a result, the ratio at which the energy of localized plasmon polaritons induced in the apertures is converted in the surface plasmons of a wire-shaped thin metal film structure surrounding the apertures can be decreased and an optical filter with a relatively small loss and high transmissivity during transmission can be obtained.

By contrast, where the FF is too low, a spectral contrast can decrease as the transmissivity increases. Therefore, there may be an optimum FF value that allows the contrast to be maintained, while also increasing the transmissivity.

FIG. 2 illustrates an example of the dependence of transmissivity intensity on a wavelength.

FIG. 2 shows a graph of transmissivity 201 obtained in a case where Al is used as a light-shielding material and square apertures with one side of 180 nm are provided in a square grid-like pattern with a period of 350 nm (FF is about 74%), a graph of transmissivity 202 obtained in a case in which square apertures with one side of 220 nm are provided in a similar manner (FF=60%), and a graph of transmissivity 203 obtained in a case where square apertures with one side of 280 nm are provided in a similar manner (FF=36%). Transmissivity 204 is obtained with square apertures with one side of 300 nm (FF is about 26%), and transmissivity 205 is obtained with square apertures with one side of 156 nm (FF=80%).

As follows from FIG. 2, in a state with a higher FF and smaller apertures, the transmissivity falls almost to zero, as transmissivity 205 or 201, in the foot portion of the resonance wavelength. If the FF is decreased, the maximum value of transmissivity gradually increases as in transmissivity 203 or 202.

However, the transmissivity at the foot of the resonance wavelength also rises, eventually a flat spectral characteristic is obtained, and a spectral contrast of a configuration with a high transmissivity decreases (204).

With consideration for light utilization efficiency in various devices using optical filters, a maximum value of transmissivity in a resonance wavelength of the optical filter be equal to or greater than approximately 50%.

Where a contrast, which is an indicator of wavelength selectivity, is considered, it may be that a transmissivity of a transmission spectrum in the foot portion of the spectrum is provided that is equal to or less than approximately 50%.

With consideration for these issues, in one version the FF may be equal to or less than about 74%, for example in order to obtain a maximum value of transmissivity at a resonance frequency that is approximately equal to or greater than 50%, and the FF may be equal to or greater than about 36%, for example in order to maintain the contrast of the transmission spectrum (in other words, in order to obtain a transmissivity equal to or less than 50% in the foot portion of the resonance peak).

Thus, it may be the case that a ratio of a surface area of the conductive layer to a surface area of the substrate surface is within a range of equal to or greater than 36% and equal to or less than 74%.

Because light with a resonance wavelength is transmitted by the localized plasmon resonance, the transmissivity spectrum generally has a certain maximum value.

The light transmitted by the filter (i.e., element) may also include light that is directly transmitted by the metallic light-shielding portion, or a scattered and propagating light component that passes in a very small amount through the apertures. The wavelength dependence of these light components is generally determined by a cut-off of the apertures.

Therefore, the wavelength dependence has neither a maximum value nor a minimum value. Accordingly, it is clear that the optical characteristics of the optical filter in accordance with the invention do not depend on cut-off of microapertures.

The research conducted by the inventors further demonstrated that an optical filter in which a thin metal film structural body is embedded in a dielectric substrate is superior to a structure in which a thin metal film structural body is simply disposed on the dielectric substrate surface and the thin metal film structural body is exposed to the air.

Thus, where the thin metal film structural body is simply disposed on the dielectric substrate, the frequency of plasmon resonance at an interface in the vicinity of a boundary portion of air and the thin metal film structural body may be different from the frequency of plasmon resonance at an interface in the vicinity of a boundary portion of the thin metal film structural body and the dielectric substrate.

As a result, the optical spectrum width is increased or peak splitting may occur, and characteristics that may not be desirable for an optical filter may develop.

In a case where the optical filter is used as a reflection filter, the reflection characteristic differs depending on whether the incident light falls from the dielectric substrate side or from the air side. Therefore, in order to demonstrate predetermined optical characteristics, an optical filter may be provided in which light is allowed to fall only from one certain direction, and thus the degree of freedom in designing an optical system using such an optical filter can be decreased. One more problem is that where dust or the like adheres to the metal surface, the peak wavelength can vary.

In a case where the variations of optical characteristics caused by the aforementioned reasons are applied to a device such as environmental sensor using a metal nanostructure, even if advantageous characteristics are obtained, the characteristics for optical filters include stability and endurance and are different from those required for the sensor.

In the optical filter in accordance with aspects of the invention, energy is transmitted from the light incoming side to the light outgoing side via local plasmons localized inside the apertures, and the energy loss occurring when the energy of electromagnetic field passes inside the apertures may be reduced.

For this purpose, it may be that an electromagnetic field distribution of local plasmons localized inside the apertures is drawn out from the metal side to the dielectric side inside the apertures by embedding a dielectric (dielectric layer) with a high dielectric constant in the apertures. Such a configuration may make it possible to decrease the fraction of energy dissipated in the metal from the electromagnetic field present inside the metal.

The investigation of a structure in which a thin metal film structural body is embedded in the dielectric demonstrated that such a structure can inhibit the splitting of spectral peaks, peak width enlargement, and the decrease in transmissivity caused by the difference with the plasmon resonance frequency at the interface of air and metal.

Furthermore, such a structure can prevent the metal from oxidation, inhibit variations in optical characteristics (shift of peak wavelength and the like) caused by adhesion of dust and the like to the metal surface, and can improve stability and endurance.

However, where a dielectric multilayer filter or colorant filter, which are typical optical filters, are to be used in devices, a thickness equal to or larger than the light wavelength may be necessary, and a typical film may have a thickness of equal to or greater than about 1 µm.

By contrast, the optical filter in accordance with aspects of the invention can be configured by using a metal film (i.e., conductive thin film) as a light-shielding member with a thickness equal to or less than about 100 nm.

Even if a protective layer is laminated to a thickness of about 100 nm on the thin metal film structural body, the total thickness of the entire layer can be limited to about 200 nm. Therefore, a filter that is thinner than the conventional filters using colorants or the like can be provided.

Therefore, where the optical filter in accordance with aspects of the invention is used in a light-receiving element such as a CCD sensor or CMOS sensor, the light-receiving element can be miniaturized. In addition, an insufficiency in the quantity of received light caused by the decrease in a point-ahead angle of pixels that results from the increase in the number of pixels in the light-receiving element can be alleviated.

Embodiments of the invention will be described below in greater detail.

FIG. 1B is a top view of an optical filter corresponding to a first embodiment of the invention. FIG. 1A is a cross-sectional view along A-A'.

A light-transmitting dielectric layer 130 is provided on the surface (i.e., on a dielectric substrate surface) of a light-transmitting dielectric substrate 110, and a light-shielding metal thin-film structural body (i.e., electrically conductive layer) 120 is selectively provided between the dielectric substrate 110 and dielectric layer 130. In other words, the dielectric layer 130 is provided on the electrically conductive layer in contact with the electrically conductive layer.

The metal thin-film structural body (i.e., electrically conductive layer) 120 has a first area constituting opposing interfaces 121 and 122 with the dielectric layer 130 in the direction normal to the dielectric substrate 110, these interfaces extending along a first direction 140 parallel to the surface of the dielectric substrate 110.

In another representation, the interfaces 121 and 122, which are interfaces between the dielectric layer and metal layer, form a pair 123 of interfaces at the thin metal film structural body 120, and these pairs 123 of interfaces are provided two-dimensionally and periodically in an isolated state in the in-plane direction of the dielectric substrate 110.

In the figure, the interfaces 121 and 122 also form part of apertures 125 having the function of light-transmitting windows formed in the thin metal film structural body 120 capable of functioning as a light-shielding portion. In this case, the dielectric layer 130 is embedded also in the apertures 125. In the explanation herein, the apertures 125 have a square grid-like arrangement, but this arrangement is not limiting.

The aperture 125 has a first length 141 in a first direction 140 and also has a second length 151 in a second direction 150 perpendicular to the first direction 140.

In this case, the first length 141 (length of the first side in the direction parallel to the dielectric substrate surface) and second length 151 (distance between the opposing first areas) are set to a length equal to or less than a wavelength of light in a visible range.

In a case where a wavelength of a localized plasmon induced at an interface by an incident light having a polarized component (electric field component) shown in the figure is of a lowest-order mode, the half-wavelength for the plasmons may be substantially equal to the length 141 of interfaces 121 and 122. Because the size of a structure in which the localized plasmons can be induced by visible light is less than an excitation wavelength of visible light, these lengths may be made equal to or less than a wavelength of light in a visible range.

Here, as an example, the apertures 125 have a square shape in which the first length 141 is equal to the second length 151, with one side being 240 nm. The square shape may be provided from the standpoint of facilitating the design of optical characteristics, but other polygonal shapes may be also used. Furthermore, the aperture may also have a round or elliptical shape. For example, a regular polygonal shape or round shape may be advantageous because polarization dependence can be inhibited. A round shape may be advantageous because production may be relatively easy and production accuracy can be easily maintained.

Figure 5:
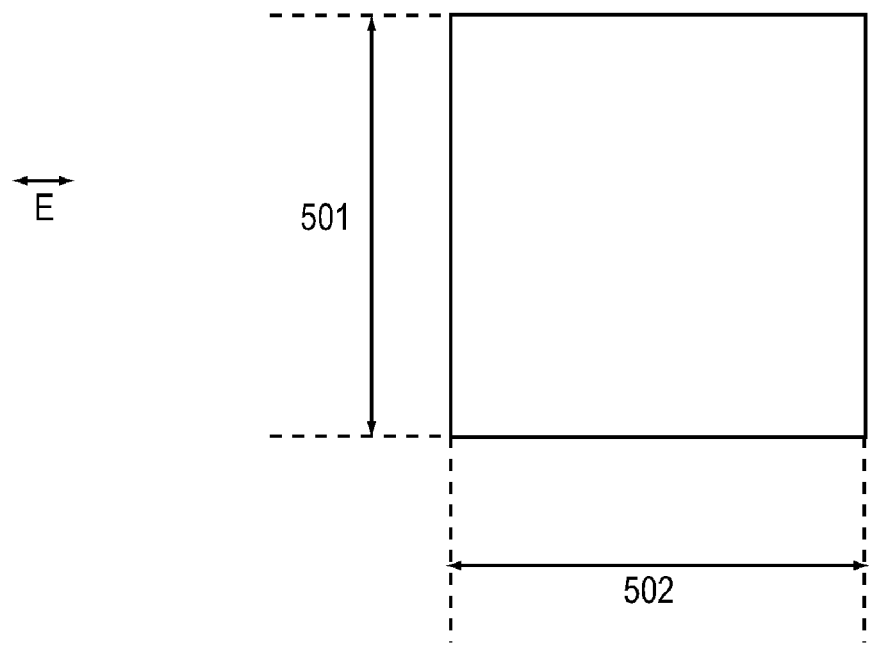
FIG. 5 is a schematic diagram illustrating the shape of an interface in accordance with an aspect of the invention.
Figure 6:
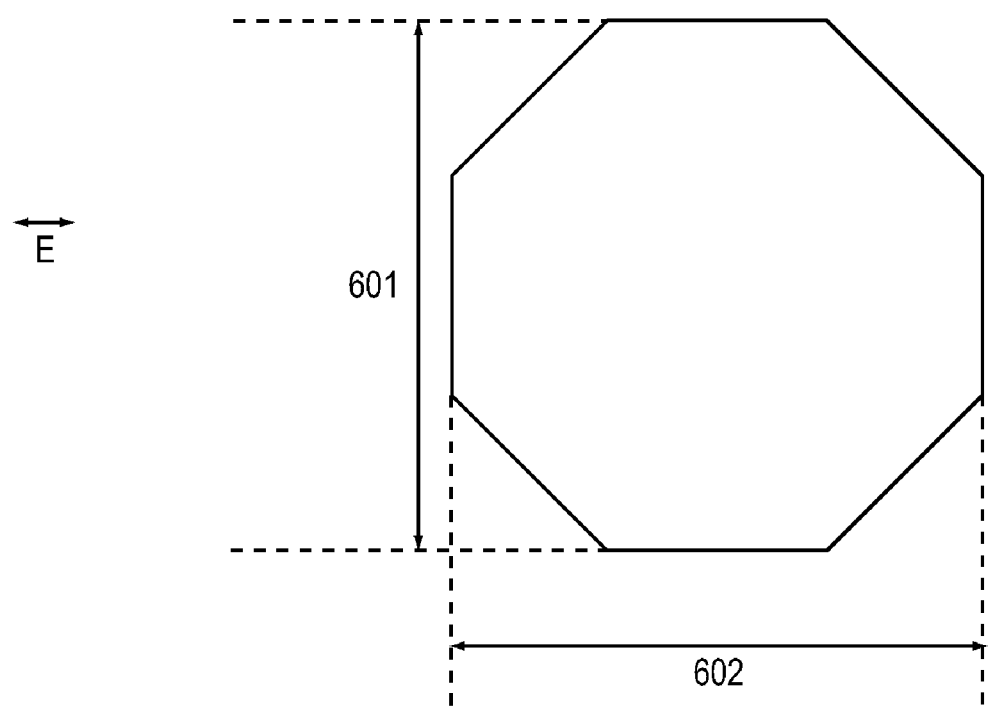
FIG. 6 is a schematic diagram illustrating the shape of an interface in accordance with another aspect of the invention.

For example, in the case of square apertures, the reference numeral 501 shown in FIG. 5 denotes the first length, and the reference numeral 502 denotes the second length.

Where the aperture provided with an interface pair (opposing interfaces) 123 has a regular polygonal shape, the first length (length of the first area in the direction parallel to the substrate surface) is taken as a length indicated by the reference numeral 601, and the second length (distance between the first areas) is taken as a length indicated by the reference numeral 602, as shown for example in FIG. 6, Furthermore, in accordance with an aspect of the invention, where the apertures have a round shape, the length of the first area in the direction parallel to the substrate surface and the distance between the opposing first areas can indicate the circle diameter.

In a case where an aperture size is referred to in the present description, it can be taken to indicate the above-described first or second length of the aperture, the diameter of a round aperture, and the diagonal length of a polygonal aperture.

For example, with a maximum wavelength of transmitted light being in a red zone (this is equal to or greater than 600 nm and equal to or less than 700 nm as the first wavelength), the aperture size can be taken as a size equal to or less than the first wavelength.

In the present embodiment, because of a resonance of the interface pair 123 and light falling on the dielectric substrate or dielectric layer, the transmissivity of a predetermined wavelength in the visible light region can be increased by localized surface plasmons induced at the surface of interfaces 121 and 122. In other words, the transmitted light of the predetermined wavelength may be preferentially (e.g., selectively) generated.

In the group of apertures (set of apertures 125) shown for example in FIGS. 1A and 1B, a period 145 and a period 155 with which the interface pairs 123 are provided may be made equal to or less than a wavelength of light in the visible region. This is because in a case where the aperture arrangement period is larger than the wavelength region of the light of interest, high-order diffracted light can be generated and the intensity of zero-order diffracted light can decrease.

Furthermore, in one version the period 145 and period 155 with which the interface pairs 123 are provided may be less than the resonance wavelength of plasmons induced in the apertures. Where the aperture period becomes close to the plasmon resonance wavelength, the so-called Wood anomaly occurs, the shape of a peak produced by the plasmon resonance can change significantly from that of the Lorentz type, and characteristics that are different from the intended and preselected optical characteristics can be demonstrated.

The Wood anomaly, as referred to herein, is a phenomenon in which the incident light is diffracted by a periodic structure and the diffracted light propagates in the extreme vicinity of the surface of the metal periodic structure and parallel to the surface, thereby increasing loss and decreasing the refraction efficiency.

Assuming, as an example, that a plasmon resonance is generated in a red wavelength zone, the periods 145 and 155 of 350 nm may be taken.

In one version, the thickness (i.e., layer thickness) 160 of the thin metal film structural body (i.e., conductive layer) 120 may be equal to or less than the light wavelength in the visible light region.

Because the length 141 and interface spacing 151 may be equal to or less than the light wavelength in the visible light region, where too large a thickness of the metal thin film structural body is set in the microprocessing process used in the production of the optical filter in accordance with the invention, the structure may be difficult to produce and the production error may become large. Accordingly, the thickness of the thin metal film (conductive layer) is herein assumed to be 60 nm by way of example.

Aluminum, gold, silver, platinum, and the like can be used as a material constituting the thin metal film structural body 120. Among them, aluminum has a plasma frequency higher than that of silver and may make it possible to relatively easily design a filter with optical characteristics that physically include the entire visible range (Ag: about 3.8 eV (about 325 nm); Al: about 15 eV (about 83 nm)). In one version, the metal film structural body 120 (i.e., conductive layer) may comprise Al or an alloy or a compound including Al.

Furthermore, because aluminum is chemically more stable than silver and the like, the predetermined optical characteristics can be demonstrated with good stability for a long time.

Moreover, because aluminum has an imaginary part of dielectric constant higher than that of silver, sufficient light shielding ability can be demonstrated even when the film thickness of aluminum is less than that of silver. In addition, microprocessing of aluminum may be easier than that of silver.

Further, because aluminum, like platinum, is chemically extremely inactive, the use thereof generally causes no inconveniences such as difficult microprocessing in dry etching.

The thin metal film structural body (dielectric layer) 120 may be from mixtures, alloys, and compounds including aluminum, gold, silver, and platinum.

A material for the dielectric substrate 110 can be appropriately selected from materials with a high transmissivity of visible light, such as at least one of quartz (silicon dioxide), metal oxides such as titanium dioxide, and silicon nitride, which are materials that transmit light in a visible region. Furthermore, polymer materials such as polycarbonates and polyethylene terephthalate also can be used for the dielectric substrate 110.

A dielectric is herein indicated as the substrate material, but the substrate in accordance with the invention is not limited to dielectrics.

The substrate in accordance with the invention is a member that supports the light-shielding conductive layer provided with apertures.

For example, in a case where an optical filter is incorporated by forming a sensor portion (a CMOS sensor or the like) having a photoelectric conversion portion on a silicon wafer, then laminating a wiring layer, an insulating layer, and the like, and then laminating a conductive layer, the silicon wafer can be called the substrate. An intermediate insulating layer or the like also can be taken as the substrate. Therefore, the substrate in accordance with the invention includes support bodies of a comparatively large thickness, such as a dielectric substrate and a semiconductor substrate, and also support bodies of a comparatively small thickness, such as a semiconductive layer and an insulating layer.

Similarly to the dielectric substrate 110, a material of the dielectric layer 130 can comprise any one or more of quartz (silicon dioxide), titanium dioxide, silicon nitride, and the like. In a case of incorporating in a semiconductor device such as a CMOS sensor, a typical insulating film that is used in a semiconductor fabrication process can be used. Furthermore, a polymer material such as a polycarbonate or polyethylene terephthalate can be also used as the material for the dielectric layer 130.

In one version, the substrate 110 may comprise a dielectric, and the difference in dielectric constant between the substrate and the dielectric layer 130 may be equal to or less than 5%.

This is because where the dielectric constant of the dielectric substrate 110 is significantly different from the dielectric constant of the dielectric layer 130, there can be a large difference between an excitation wavelength of plasmons at the end portions of interfaces 121 and 122 at the side of the dielectric substrate 110 and the excitation wavelength of plasmons at the end portions of interfaces 121 and 122 at the side of the dielectric layer 130.

Thus in this case, a peak at an unexpected resonance wavelength, or increase in peak width, can occur.

Accordingly, in one version the dielectric constant of the dielectric substrate may be identical to the dielectric constant of the dielectric layer.

The optical filter in accordance with aspects of the invention may have a laminated configuration in which a plurality of layers of the thin metal film structural body are laminated in the dielectric layer.

Optical characteristics of the laminated element, and more particularly a transmission spectrum thereof, will be described below.

In a case where the interlayer distance during lamination is equal to or greater than a distance (typically about 100 nm) that is reached by the near-field distribution of localized plasmons induced in each thin metal film structural body, a spectrum of the product of transmission spectra of the layers of the thin metal film structural body may occur. This may be because optical characteristics of each thin metal film structural body are maintained since no near-field interaction occurs between the thin metal film structural bodies. In this embodiment, optical characteristics of the entire element may be comparatively easy to design.

By contrast, where the aforementioned distance between the thin metal film structural bodies is equal to or less than 100 nm, the localized plasmons induced in the thin metal film structural bodies will interact with each other. As a result, optical characteristics can become complex.

By contrast with the case in which the aforementioned interaction is absent, various changes such as splitting or broadening of transmission spectrum peaks, and decrease or increase in transmissivity, may occur. Although optical characteristics of the entire element may be difficult to design in this case, it may be possible to form a spectrum shape that is more complex than that of a single-layer configuration.

Figure 7:
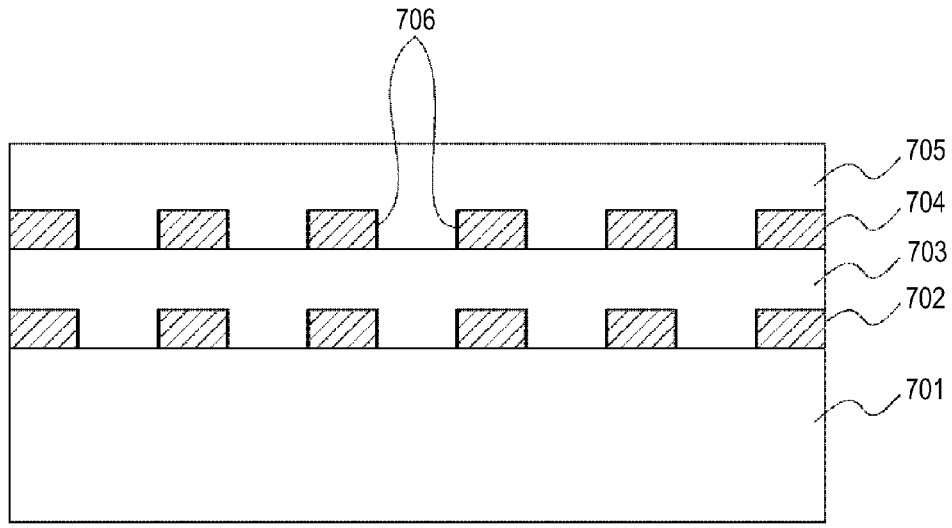
FIG. 7 is a schematic diagram illustrating an example of the invention.

Referring to FIG. 7, a first thin metal film structural body 702 is formed on a dielectric substrate 701, and then a first dielectric layer 703 is coated. A second thin metal film structural body 704 is disposed on the first dielectric layer 703, and a second dielectric layer (another dielectric layer) 705 is formed on the second thin metal film structural body.

As a result, for example, by laminating a two-layer optical filter R, it may be possible to obtain a transmission spectrum that has a finer line width than that of a single-layer configuration.

The configurations of the first thin metal film structural body 702 and the second thin metal film structural body 704 are not limited to those with an identical arrangement period of apertures 706, or those with an identical shape of apertures.

In the laminated optical filter of the present embodiment, from the standpoint of ease of design, it may be that lamination is performed with a lamination spacing that causes practically no near-field interaction. For example, a lamination spacing equal to or greater than 100 nm may be provided.

(Computation Results)

Figure 8:
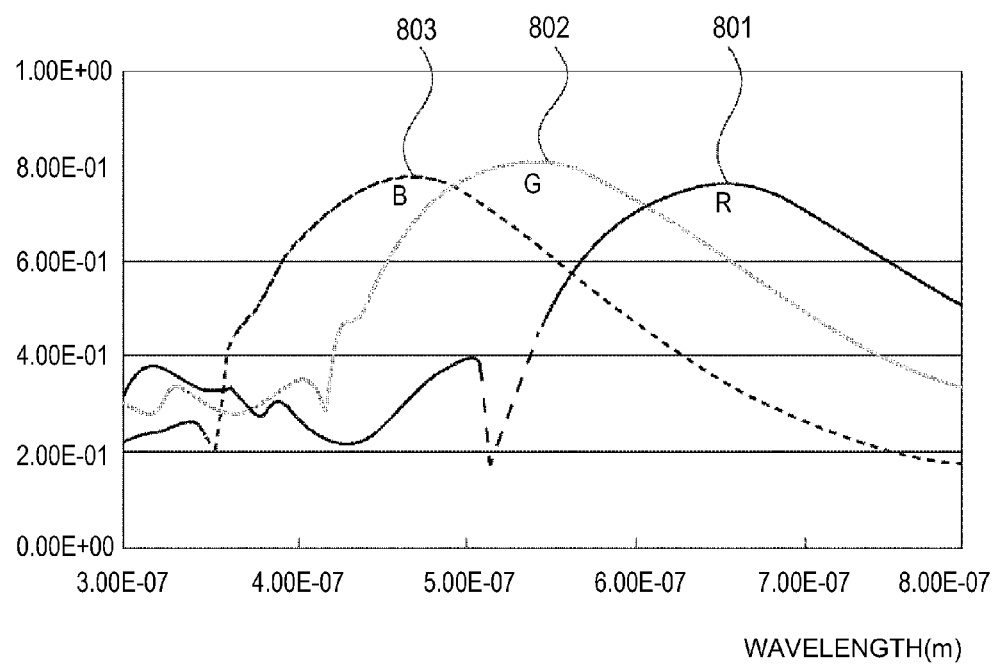
FIG. 8 is a graph illustrating the dependence of a light transmission intensity on a wavelength.

FIG. 8 shows a graph representing the results obtained by using the above-described structure and conducting numerical computations. This graph shows the dependence of transmission intensity on wavelength.

In the filter used herein, aluminum was used as the thin metal film structural body, the aperture diameter was set to 240 nm, the period was 350 nm, and the thickness was 60 nm. The transmission spectrum of the optical filter is like a transmission spectrum 801, and the optical filter functions to transmit light with a wavelength close to 650 nm with high intensity.

Because the wavelength of 650 nm is within a red zone, a word "Red" is used to denote the optical filter R. Because this optical filter R transmits a red color wavelength, the filter can be used as a red primary color filter.

The wavelength of the transmission spectrum, the spectral width, and the transmissivity can be varied by varying the aperture diameter or period.

For example, an optical filter having a transmission spectrum 802 with a maximum of transmissivity close to green of a visible range (wavelength 550 nm) can be constituted by taking an aperture diameter of 200 nm, a period of 280 nm, and a thickness of 60 nm. This filter will be referred to as an optical filter G. The optical filter G can be used as a green primary color filter.

Likewise, an optical filter having a transmission spectrum 803 with a maximum of transmissivity close to blue in a visible range (wavelength 450 nm) can be constituted by taking an aperture diameter of 160 nm, a period of 230 nm, and a thickness of 60 nm. This filter will be referred to as an optical filter B. The optical filter B can be used as a blue primary color filter.

In the reflection spectrum of the optical filter of the present embodiment, reflectivity is minimal in the vicinity of a wavelength at which transmissivity is maximal. The optical filter of the present embodiment can thus be used not only as a transmission filter, but also as a reflection filter.

(Design Guidelines)

The relationship between parameters constituting the thin metal film structural body and optical characteristics will be explained below.

The localized plasmon resonance induced in the apertures is a charge density distribution accompanying plasma oscillations of free electrons at the interfaces, and this charge density distribution or optical characteristics of the apertures can be affected by the shape of apertures.

For example, where a length of apertures in the direction perpendicular to a polarization direction is increased, while maintaining a constant length of the apertures in the polarization direction of light illuminating the apertures, the thickness of metal layer, and the arrangement period of apertures, the resonance wavelength will shift to longer wavelengths. Furthermore, not only will the resonance wavelength shift to the longer wavelengths, but the peak width and transmissivity in the transmission peak will also increase.

Thus, it is clear that in order to generate a longer wavelength of localized plasmon resonance in the apertures, the length of apertures in the direction perpendicular to the polarization direction may be increased. Polarization of light falling on the optical filter may not be required to be strictly parallel to the normal direction of the apertures.

In a state in which the length of apertures in the direction perpendicular to the polarization direction of light illuminating the apertures, the thickness of metal layer, and the arrangement period of apertures are constant, the resonance wavelength shifts to shorter wavelengths with the increase in the length of apertures in the polarization direction. Furthermore, the peak width increases and transmissivity at the resonance wavelength also increases.

In a state in which the length of apertures in the polarization direction of light illuminating the apertures, the length of apertures in the direction perpendicular to the polarization direction, and the arrangement period of apertures are constant, the increase in metal layer thickness may practically not change the resonance wavelength, but the transmissivity at the resonance wavelength and resonance width decrease.

In a state in which the length of apertures in the polarization direction of light illuminating the apertures, the length of apertures in the direction perpendicular to the polarization direction, and the metal layer thickness are constant, the increase in the aperture arrangement period tends to shift the resonance wavelength to longer wavelengths, decrease the transmissivity at the resonance wavelength, and decrease the resonance width.

Based on these findings, the parameters such as aperture shape and aperture arrangement period can be optimized, and an optical filter having the predetermined resonance wavelength can be designed.

The results of investigation conducted by the inventors demonstrated that in order to obtain a resonance wavelength of an optical filter in a red zone, that is, within a wavelength range of equal to and higher than 600 nm and equal to or less than 700 nm (i.e., a maximum value of a transmission spectrum within the wavelength range), the aperture diameter may be set in a range of equal to or greater than 220 nm and equal to or less than 270 nm. Furthermore, the thickness of the thin metal film structural body may be set in a range of equal to or greater than 10 nm and equal to or less than 200 nm, and the aperture arrangement period may also be set within a range of equal to or greater than 310 nm and equal to or less than 450 nm.

In order to obtain a resonance wavelength of an optical filter in a green zone, that is, within a wavelength range of equal to or greater than 500 nm and lower than 600 nm (i.e., a maximum value of a transmission spectrum within the wavelength range), the aperture diameter may be set in a range of equal to or greater than 180 nm and lower than 220 nm.

Furthermore, the thickness of the thin metal film structural body may be set in a range of equal to or greater than 10 nm and equal to or less than 200 nm, and the aperture arrangement period may also be set within a range of equal to or greater than 250 nm and equal to or less than 310 nm.

In order to obtain a resonance wavelength of an optical filter in a blue zone, that is, within a wavelength range of equal to or greater than 400 nm and lower than 500 nm (i.e., a maximum value of a transmission spectrum within the wavelength range), the aperture diameter may be set in a range of equal to or greater than 100 nm and lower than 180 nm.

Furthermore, the thickness of the thin metal film structural body may be set in a range of equal to or greater than 10 nm and equal to or less than 200 nm, and the aperture arrangement period may be set within a range of equal to or greater than 170 nm and equal to or less than 250 nm.

In a second embodiment an RGB filter with Bayer arrangement will be explained.

Figure 9:
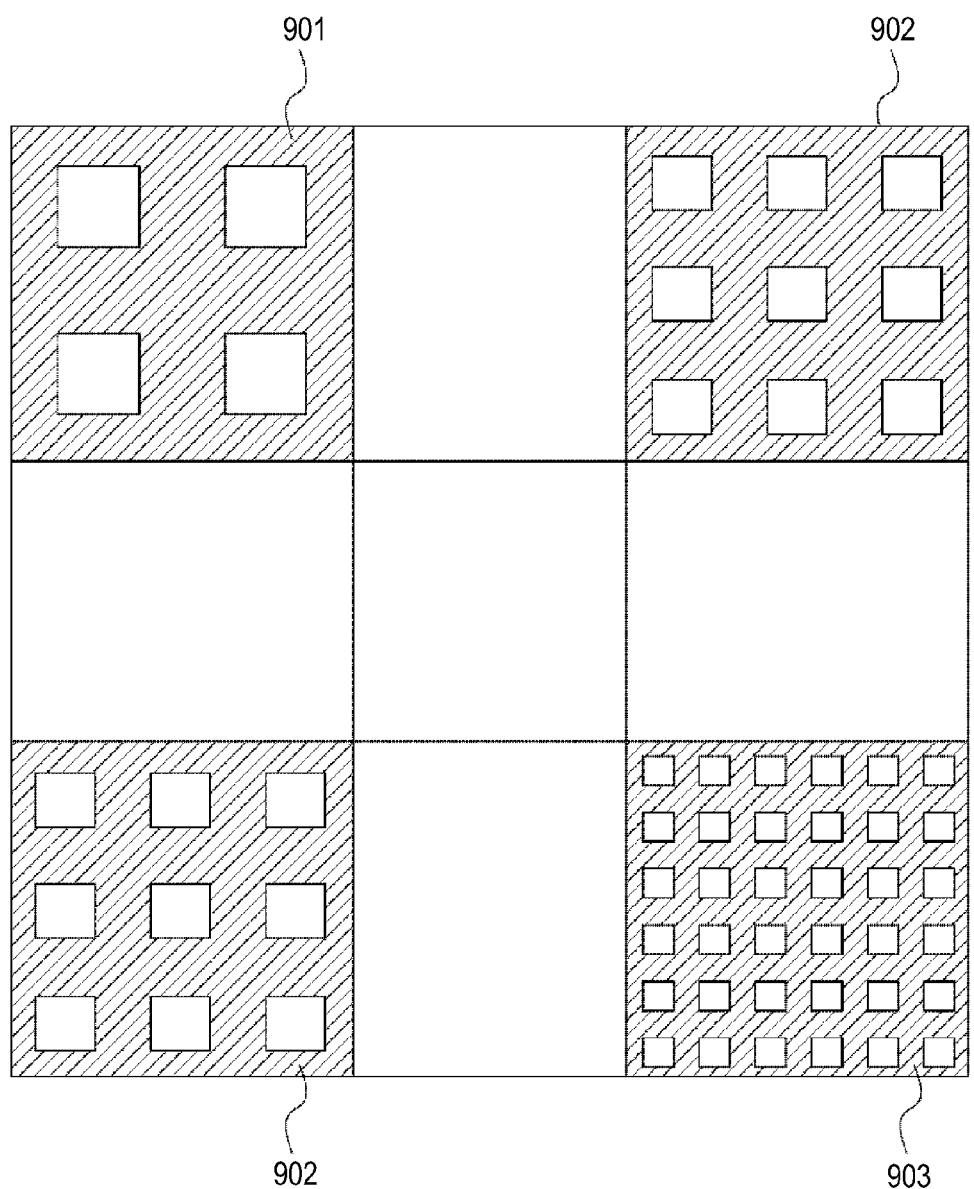
FIG. 9 is a schematic diagram illustrating an example of the invention.

As shown in FIG. 9, for example, the above-described optical filter R (e.g., transmission spectrum 801) is disposed in a region 901, the optical filter G (e.g., transmission spectrum 802) is disposed in a region 902, and the optical filter B (e.g., transmission spectrum 803) is disposed in a region 903. By using the filter in accordance with aspects of the invention with such a disposition, it may be possible to configure a color filter with a Bayer arrangement. In the present embodiment, the aperture shape is different in each region and the aperture arrangement period is also different, but such a configuration is not limiting. For example, aperture groups that differ only in the aperture period may be disposed in the regions. Alternatively, aperture groups that differ only in the size of apertures may be disposed in the regions.

In other words, there may be two or more first aperture groups, the first apertures may be provided with mutually different periods, and the first aperture groups may be disposed in mutually different regions of the dielectric substrate surface.

A second aperture group including second apertures of a shape different from that of the first apertures constituting the first aperture group may be disposed in the regions. Thus, the second aperture has a first length in a first direction and a second length in a second direction, and the first length of the second aperture differs from the first length of the first aperture, or the second length of the second aperture differs from the second length of the first aperture. As a result, the second aperture group may be capable of increasing the transmissivity of light at a wavelength (second wavelength) different from the resonance wavelength (first wavelength) of the first aperture group.

Figure 10:
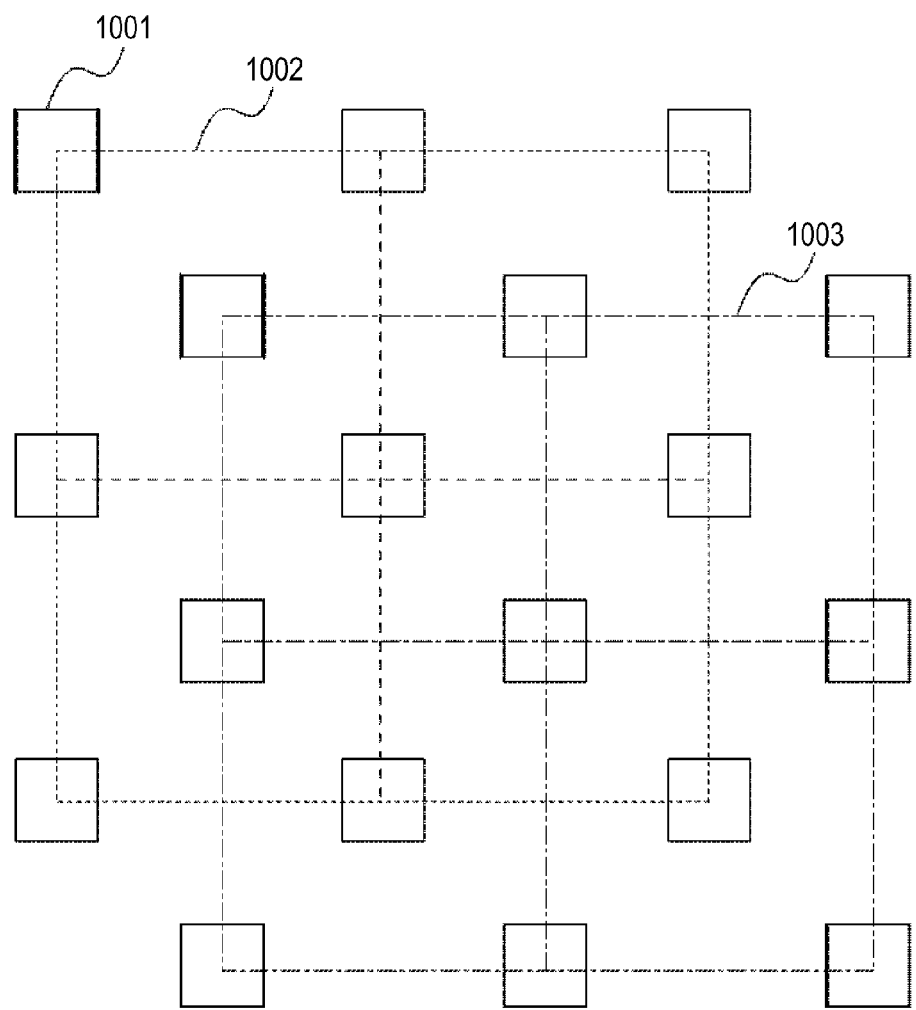
FIG. 10 is a schematic diagram illustrating an example of the invention.

FIG. 10 illustrates a third embodiment in which square apertures are arranged in a triangular grid. In a case where a triangular grid arrangement is used, unit vector components of the grid may not be orthogonal. Therefore, the dependence of optical characteristics of the filter on incident light polarization, or spectral variations caused by oblique irradiation, can be inhibited to a greater extent than in the square grid arrangement.

Such a triangular grid arrangement can be also represented as an arrangement in which a plurality of apertures arranged in an orthogonal grid are disposed in overlapping regions.

Thus, a first aperture group 1002 (dot lines in the figure) and a second aperture group 1003 (dot-dash line in the figure) constituted by first apertures 1001 can be represented as being disposed in overlapping regions.

In a fourth embodiment, an example will be explained in which, similarly to the third embodiment, a plurality of aperture groups are disposed with overlapping.

Figure 11A:
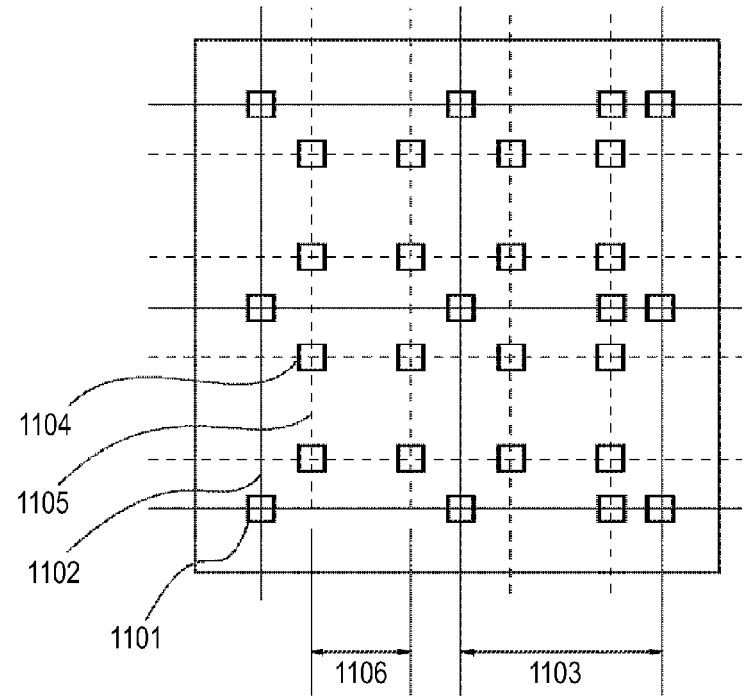
FIGS. 11A and 11B are schematic diagrams illustrating an example of the invention.

FIG. 11A shows an example in which first aperture groups that have different periods are disposed in overlapping regions. First apertures 1101 constituting the first aperture group 1102 (solid lines in the figure) are provided with a period 1103, and first apertures 1104 constituting a second aperture group 1105 are provided with a period 1106. In the present embodiment, because the arrangement periods of apertures are mutually different, an optical filter can be configured that has optical characteristics inherent to the two aperture groups.

Thus, the optical filter shown in FIG. 11A has two or more first aperture groups in the in-plane direction of the dielectric substrate, and the arrangement periods of the first apertures constituting the two or more first aperture groups are mutually different. Furthermore, these two or more first aperture groups are disposed in overlapping regions.

Figure 11B:
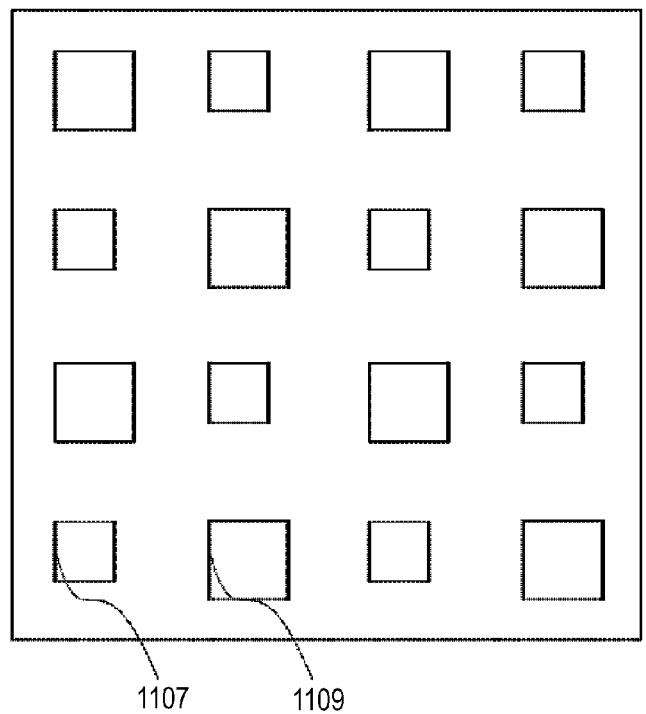

FIG. 11B shows an example in which a first aperture group and a second aperture group are disposed in overlapping regions. First apertures 1107 constitute a first aperture group 1108, and second apertures 1109 constitute a second aperture group 1110. Because the apertures constituting the aperture groups are different, optical characteristics inherent to the two aperture groups can be demonstrated at the same time.

Thus, the optical filter shown in FIG. 11B has, separately from the first aperture group, the second aperture group in which a plurality of second apertures are provided two-dimensionally and periodically in an isolated state in the in-plane direction of the dielectric substrate. The second aperture has a first length in a first direction and a second length in a second direction, and the first length and second length are equal to or less than a light wavelength in a visible region. The first length of the second aperture is different from the first length of the first aperture, or the second length of the second aperture is different from the second length of the first aperture, and the first aperture group and second aperture group are disposed in overlapping regions. As a result, the resonance wavelength (first wavelength) of the first apertures is different from the resonance wavelength (second wavelength) of the second apertures.

Figure 17:
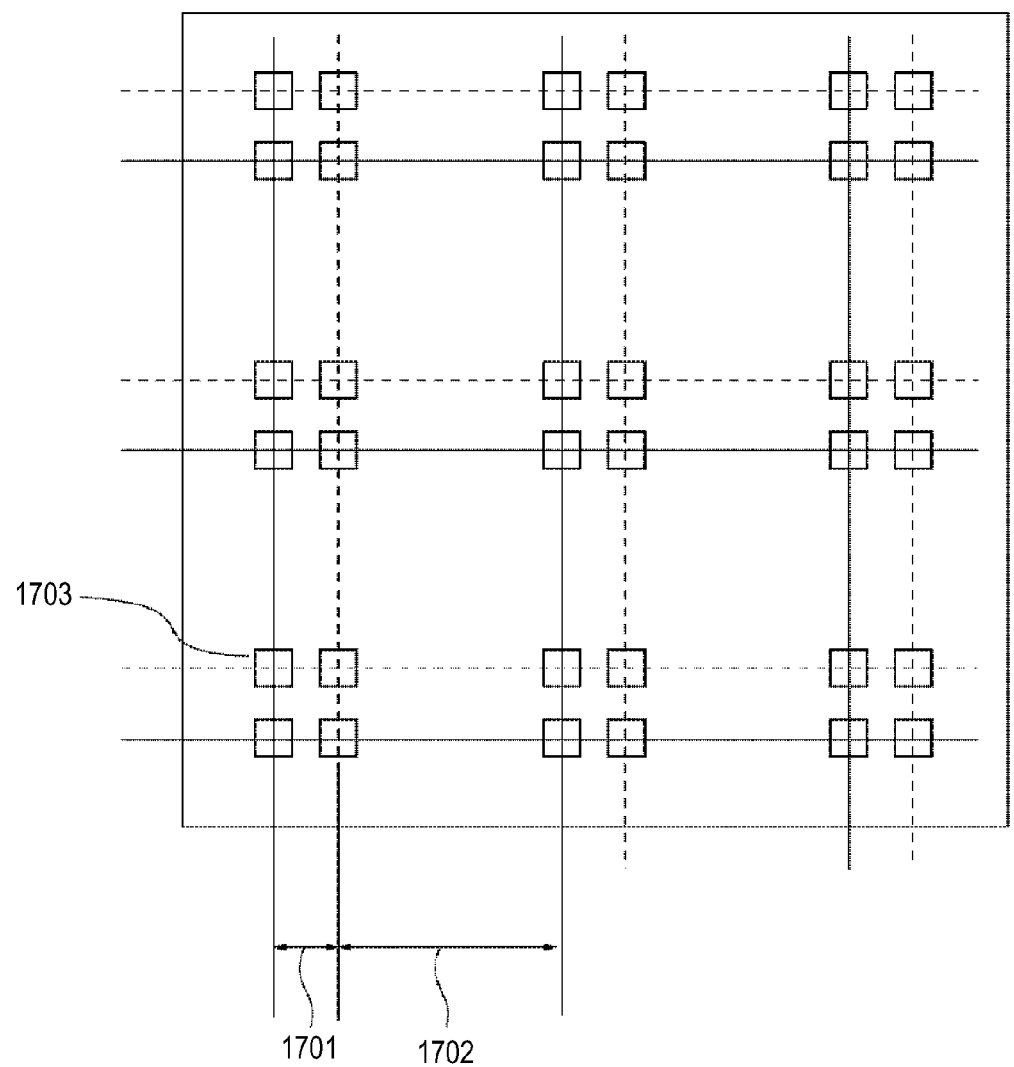
FIG. 17 is a schematic diagram illustrating an example of the invention.

Such an embodiment also includes, for example, an optical filter (e.g., FIG. 17) in which apertures 1703 are arranged with a plurality of periods (period A 1701 and period B 1702) in a plane. FIG. 17 shows an example of arrangement in which a square grid has a plurality of periods, but the number of periods, etc., of this embodiment are not limiting.

The invention will be described hereinbelow in greater detail on the basis of specific examples thereof, but it should be understood that the invention is not limited to these examples.

Example 1

Monolayer Structure

A method for producing a RGB transmission filter and optical characteristics of the filter will be described below.

Figure 12A:
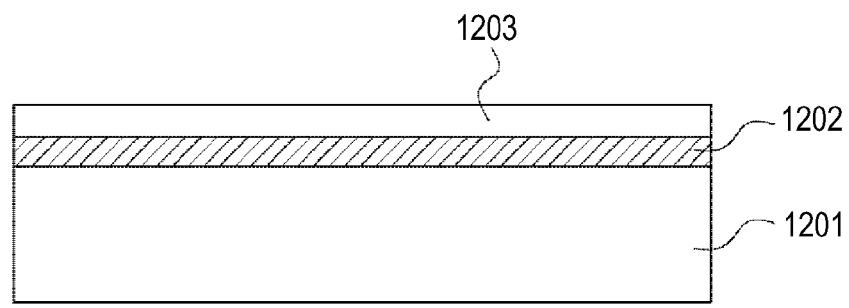
FIGS. 12A and 12B are explanatory drawings illustrating Example 1 of the invention.

FIG. 12A is a schematic diagram illustrating a state in which aluminum is vapor deposited as a thin metal film layer 1202 to a thickness of 60 nm on the surface of a dielectric substrate 1201 composed of a quartz substrate with a thickness of 525 μm and a resist 1203 for electron beam (EB) lithography is coated on the thin metal film layer. A method for forming the thin metal film layer 1202 is not limited to only vapor deposition, and may also be sputtering or the like.

The resist 1203 is then patterned by using an EB lithography device. The resist pattern is produced to a shape such that square apertures with one side of about 240 nm are arranged in a square grid with a period of about 350 nm. A thin metal film structural body 1204 can be formed by dry etching with plasma of a gaseous mixture of chlorine and oxygen by using the resist pattern as an etching mask. The dry etching gas is not limited to chlorine and oxygen, and argon or other gases may be also used.

A method for fabricating the etching mask is not limited to EB lithography, and photolithography or the like may be also used. Furthermore, patterning of the thin metal film layer 1202 may be also performed by forming a resist pattern by EB lithography or photolithography on the dielectric substrate 1201, forming the thin metal film layer 1202, and then using a lift-off process. When the lift-off process is used, the negative-positive inversion has to be performed with respect to the above-described process.

The thin metal film layer 1202 may be also directly processed by using a focused ion beam processing device (FIB processing device).

Figure 12B:
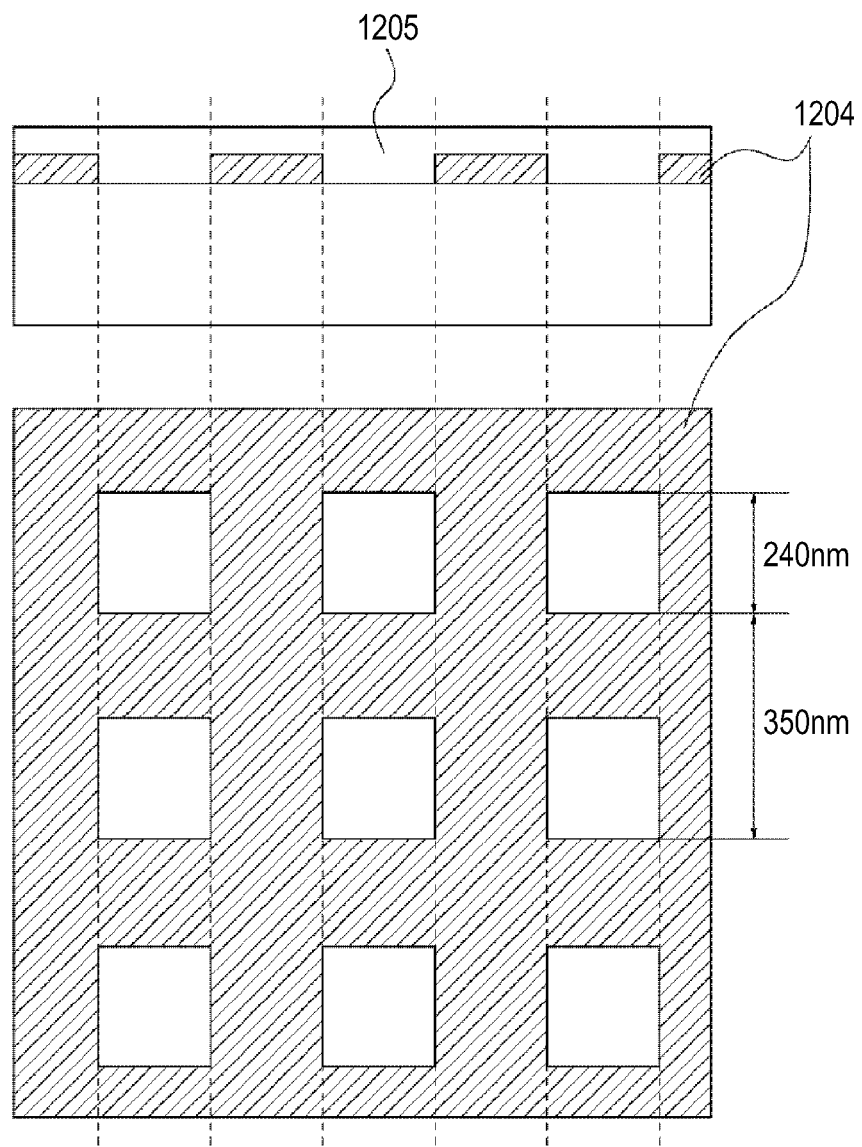

A thin quartz film is then formed by sputtering to a thickness of 300 nm as a dielectric layer 1205 on the thin metal film structural body 1204. The optical filter thus formed is shown in FIG. 12B. The film formation method is not limited to sputtering, and the film can also be formed by CVD, or can be coated by a SOG (Spin On Glass) method. HSG (hydrogenated silsesquioxane) is an example of inorganic SOG and MSQ (methyl silsesquioxane) is an example of organic SOG.

Figure 13A:
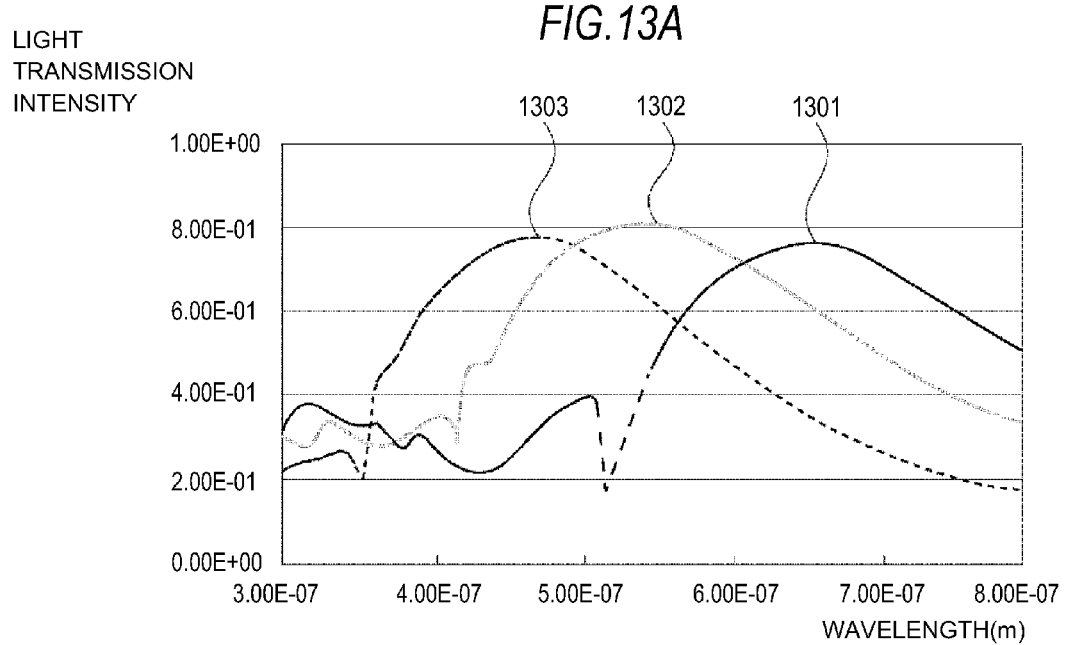
FIGS. 13A and 13B are graphs illustrating the dependence of a light transmission intensity on a wavelength.

FIG. 13A shows a transmission spectrum of the optical filter produced in the above-described manner. A transmission spectrum R denoted by the reference numeral 1301 was found by numerical computations. It is clear that this filter has a maximum value of transmissivity in the vicinity of a wavelength of 650 nm. Because the wavelength at which the transmission peak is shown corresponds to a red color of a visible range, the filter functions as a primary color filter that transmits red light.

A transmission spectrum G denoted by the reference numeral 1302 is obtained by providing a thin metal film structural body 1204 with an aperture diameter of about 200 nm, a thickness of about 60 nm, and an aperture arrangement period of about 280 nm. Likewise, a transmission spectrum B denoted by the reference numeral 1303 is obtained with an aperture diameter of about 160 nm, a thickness of about 60 nm, and an aperture arrangement period of about 230 nm. These optical filters transmit RGB, respectively, and function as primary color filters.

The reflection spectrum of the filter of this example has a minimum reflectivity at a wavelength almost equal to a wavelength at which the transmissivity has a maximum.

Figure 13B:
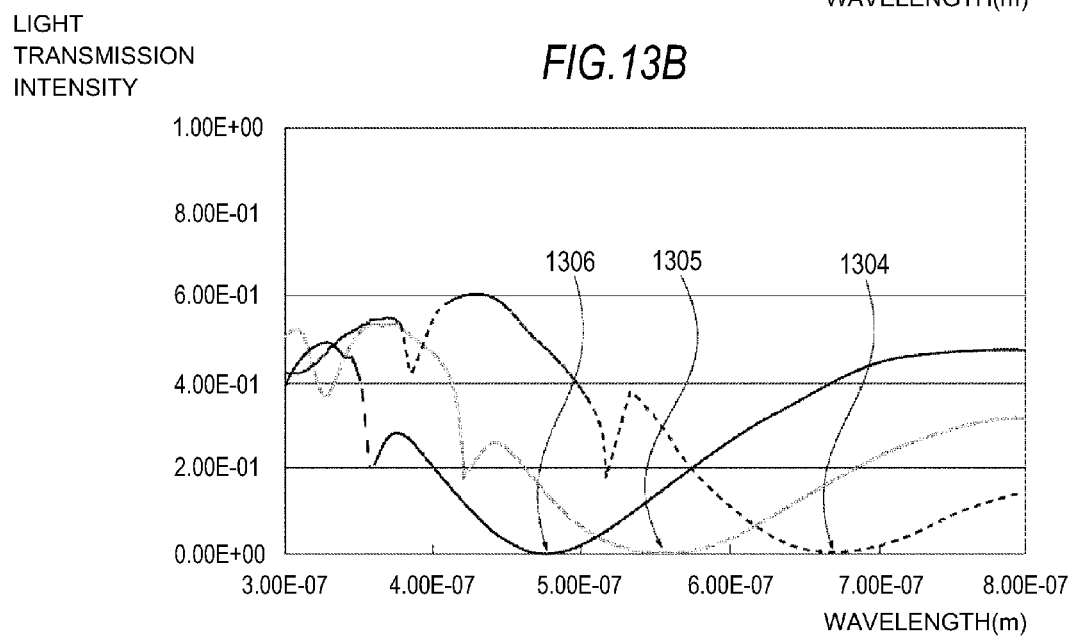

Therefore, by using the optical filter of the present example as a reflection filter, as shown in FIG. 13B, it is possible to obtain a reflection spectrum R denoted by the reference numeral 1304 from the filter having a transmission spectrum R. Likewise, the filter having a transmission spectrum G can produce a reflection spectrum G denoted by the reference numeral 1305, and the filter having a transmission spectrum B makes it possible to obtain a reflection spectrum B denoted by the reference numeral 1306. Thus, these optical filters can function as optical filters that intensively reflect auxiliary colors (cyan, magenta, yellow) of red, green, and blue of the visible range.

The present example is explained by using a configuration in which square apertures are arranged in a square grid in a thin metal film structural body, but a triangular grid arrangement may be also used. With the triangular grid arrangement, the dependence of incident light polarization can be inhibited and oblique incidence characteristic may be improved. Furthermore, the aperture shape is not limited to square, and may also be, for example, a regular rectangle or a circle.

Example 2

Bayer Configuration

A method for producing a RGB transmission filter of a Bayer configuration and optical characteristics of the filter will be described below.

Figure 14A:
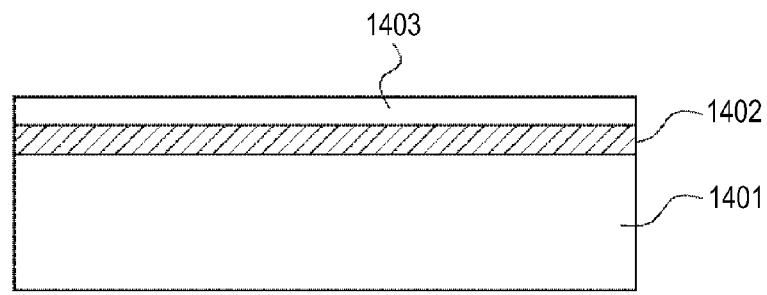
FIGS. 14A to 14C are explanatory drawings illustrating Example 2 of the invention.

FIG. 14A is a schematic diagram illustrating a state in which aluminum is vapor deposited as a thin metal film layer 1402 to a thickness of 60 nm on the surface of a dielectric substrate 1401 composed of a quartz substrate with a thickness of 525 µm and a resist 1403 is coated on the thin metal film layer.

The resist 1403 is then patterned by using an EB lithography device. The resist pattern shape is such that a patterned square shape in which square apertures with one side of about 240 nm are arranged in a square grid with a period of about 350 nm has a side of about 10 µm, and such a patterned square shape is taken as a pattern portion A 1404.

A square shape in which square apertures with one side of about 200 nm are arranged in a square grid with a period of about 280 nm is taken as a pattern portion B 1405, and a square shape in which square apertures with one side of about 160 nm are arranged in a square grid with a period of about 230 nm is taken as a pattern portion C 1406.

Figure 14B:
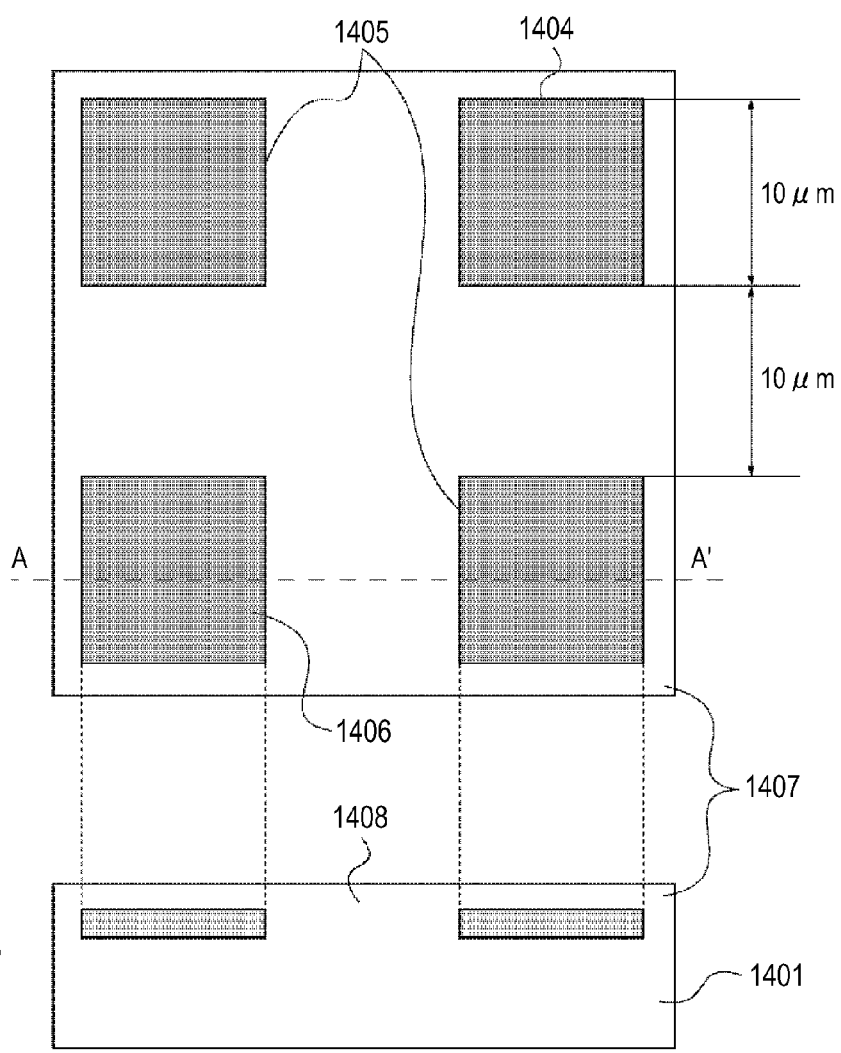

A structure in which these pattern portions are disposed with a spacing of 10 µm therebetween as shown in FIG. 14B is produced. A thin metal film structural body 1407 is produced by dry etching with plasma of a gaseous mixture of chlorine and oxygen.

The shape of apertures is not limited to a square shape and may be polygonal or round.

Figure 14C:
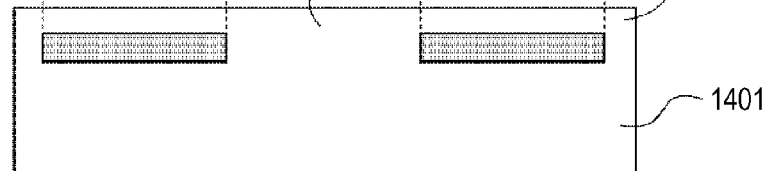

A thin quartz film with a thickness of 500 nm is formed as a dielectric layer 1408 by sputtering on the thin metal film structural body 1407. The optical filter thus formed is shown in FIG. 14C. FIG. 14C is an A-A' section in FIG. 14B.

A light-shielding layer may be formed to prevent color mixing between the above-described pattern portions. Furthermore, where the thickness of thin metal film structural bodies constituting pattern portions is the same, as in the present example, these pattern portions can be fabricated in the same process and boundaries between the pattern portions can be eliminated.

The pattern portions A, B, and C produced in the above-described manner have a transmission spectrum R indicated by the reference numeral 1301, a transmission spectrum G indicated by the reference numeral 1302, and a transmission spectrum B indicated by the reference numeral 1303, as shown for example in FIG. 13A. These pattern portions can function as respective RGB primary color filters.

Furthermore, where all the pattern portions are produced to have the same thickness, as in the present example, RGB primary color filters can be produced in the same batch.

Therefore, a process for separate coating of three colors RGB to produce a Bayer arrangement structure with the conventional color filters using colorants may become unnecessary, the production process time can be shortened, and the production process can be simplified. Separate coating of three colors RGB is not limited to Bayer arrangement and may be performed when any color filter is configured using different colorants.

Example 3

Hole Lamination

A method for producing a laminated filter and optical characteristics of the filter will be described below.

Figure 15A:
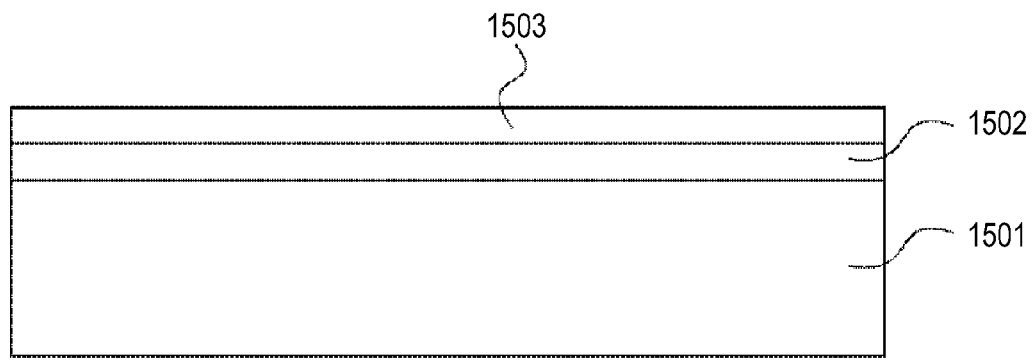
FIGS. 15A to 15C are explanatory drawings illustrating Example 3 of the invention.

FIG. 15A is a schematic diagram illustrating a state in which aluminum is vapor deposited as a thin metal film layer 1502 to a thickness of 60 nm on the surface of a dielectric substrate 1501 composed of a quartz substrate with a thickness of 1 mm and a resist 1503 for electron beam (EB) lithography is coated on the thin metal film layer.

The resist 1503 is then patterned by using an EB lithography device. The resist pattern shape is obtained by arranging square apertures with one side of about 240 nm in a square grid with a period of about 350 nm. A first thin metal film structural body 1504 is produced by dry etching with plasma of a gaseous mixture of chlorine and oxygen.

A thin quartz film with a thickness of 300 nm is formed as a first dielectric layer 1505 on the first thin metal film structural body 1504. The thickness of the first dielectric layer 1505 is not limited to 300 nm, but an interlayer distance may be provided that substantially does not affect the near-field interaction with a second thin metal film structural body that will be produced in the next process.

Figure 15B:
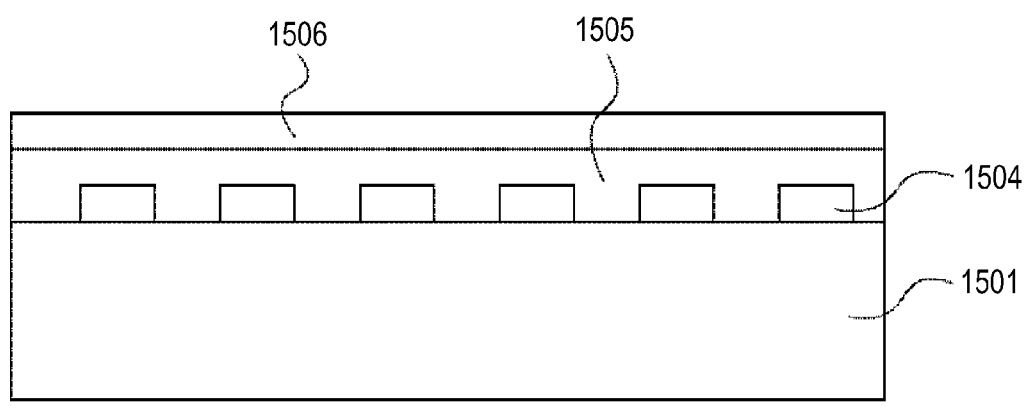

Then, as shown in FIG. 15B, aluminum is vapor deposited as a second thin metal film layer 1506 to a thickness of 60 nm on the surface of the first dielectric layer 1505. Thus, a plurality of conductive layers are disposed on the dielectric substrate. Then a resist for electron beam (EB) lithography is coated as a resist layer on the second thin metal film layer 1506. The resist layer is then patterned by using an EB lithography device. The resist pattern shape is obtained by arranging square apertures with one side of about 240 nm in a square grid with a period of about 350 nm. A second thin metal film structural body 1507 is produced by dry etching with plasma of a gaseous mixture of chlorine and oxygen by using the resist pattern as an etching mask.

Figure 15C:
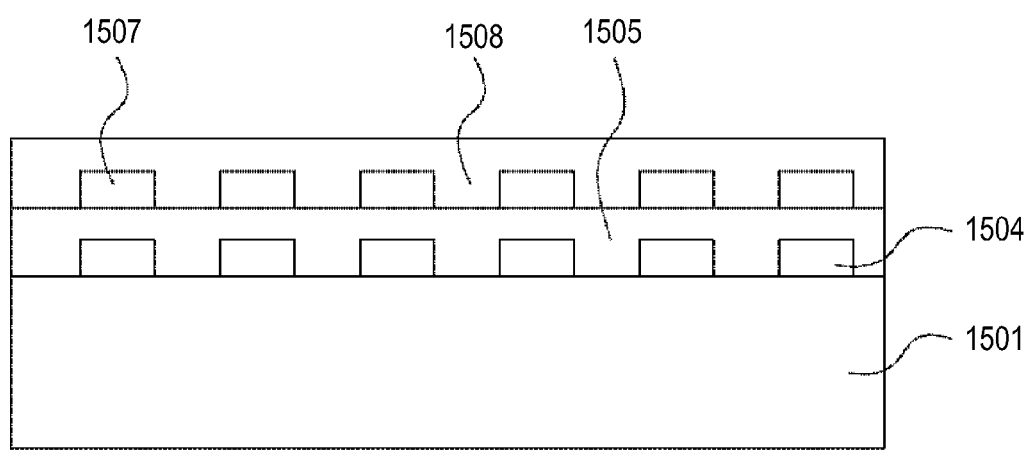

Then, as shown in FIG. 15C, a thin quartz film with a thickness 400 nm is formed by sputtering as a second dielectric layer 1508 on the second thin metal film structural body 1507.

The transmission spectrum of the first thin metal film structural body and second thin metal film structural body of the filter has a peak wavelength close to about 650 nm, and the transmission spectrum of the second thin metal film structural body also has a peak wavelength close to about 650 nm. As a result, optical characteristics of the laminated filter of the present example are close to optical characteristics representing a product of the transmission spectrum of the first thin metal film structural body and the transmission spectrum of the second thin metal film structural body. Therefore, the laminated filter of the present example functions as an optical filter that transmits red in a band that is narrower than that of a monolayer filter.

Example 4

The present example relates to a light detection element using any of the optical filters explained in Examples 1 to 3, an image pickup element in which light detection elements are arranged in an array, and a digital camera incorporating the image pickup element.

Figure 18:
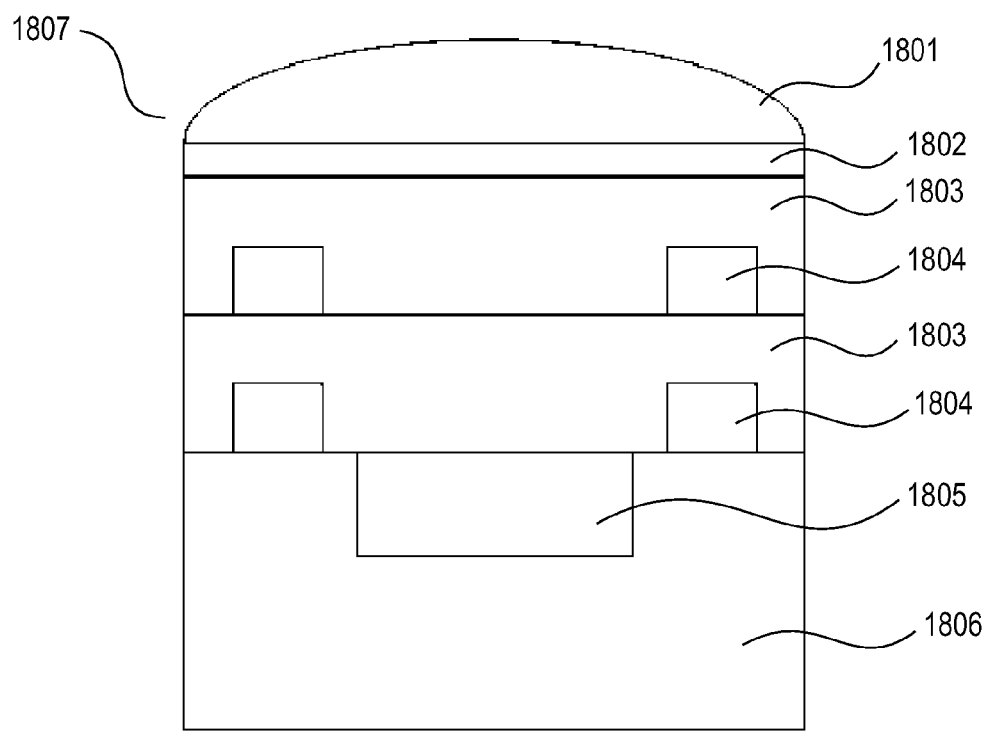
FIG. 18 is a schematic diagram of Example 4.

FIG. 18 is a schematic diagram of a light detection element using the optical filter of the invention.

In a light detection element 1807, light falling from the outside through a microlens 1801 is introduced in a photoelectric conversion unit 1805. In the photoelectric conversion unit, an electric charge corresponding to the incident light is generated. In addition to the photoelectric conversion unit 1805, the light detection element includes an optical filter 1802 disclosed in the invention, a dielectric layer 1803, an electric circuit unit 1804, and a semiconductor substrate 1806. The optical filter 1802 includes a structure in which a plasmon resonance can be induced in response to the falling light, as in the metal structural body 120 shown in FIGS. 1A and 1B.

A method for producing such a light detection element will be described below.

First, the photoelectric conversion unit 1805 is formed on the semiconductor substrate 1806, and the electric circuit unit 1804 is patterned from above by using photolithography or the like. A process of forming the dielectric layer 1803 is then repeated, thereby forming the predetermined number of electric circuit layers and dielectric layers. A metal layer is then formed from above and apertures are patterned by using a microprocessing device such as an electron beam lithography device, thereby forming the optical filter 1802. A light detection element using the optical filter of the invention can be thereafter produced by forming the microlens 1801 from above by using a resin or the like.

In this configuration, the optical filter is disposed directly below the microlens, but the disposition area of the optical filter is not limited by such a configuration. For example, the optical filter may be laminated directly above or close to the photoelectric conversion layer, or between the electric circuit layers. In order to generate a plasmon resonance effectively with the optical filter even in a case where the optical filter is located directly above the photoelectric conversion layer, a structure may be provided in which a thin electrically insulating layer is provided between the optical filter and photoelectric conversion layer to provide electric insulation. As a result, the energy of plasmon resonance can be substantially prevented from dissipating to the semiconductor substrate or photoelectric conversion layer. By thus bringing the optical filter close to the photoelectric conversion portion, it may also be possible to detect with good efficiency a scattered light component produced by the optical filter with the photoelectric conversion portion FIG. 19 is a schematic diagram of an image pickup element using the optical filter of the invention.

Figure 19:
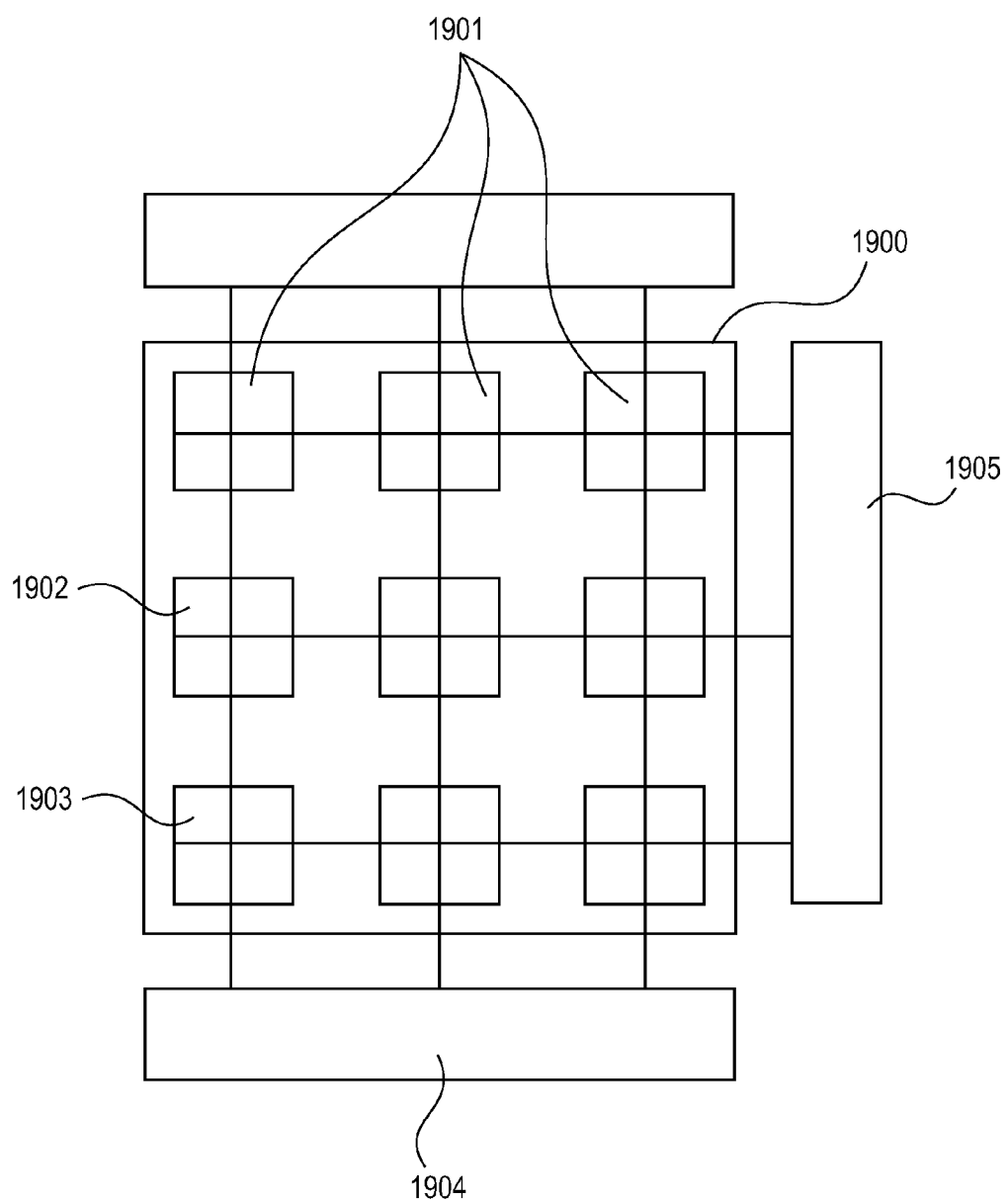
FIG. 19 is a schematic diagram of Example 4.

In FIG. 19, a plurality of the above-described light detection elements (pixels) 1901 are arranged as a 3 rows×3 columns two-dimensional matrix in a pixel area 1900. In FIG. 19, the pixel area 1900 is in the form of a 3 rows×3 columns two-dimensional matrix, but it can be also, for example, a 7680 rows×4320 columns matrix. In FIG. 19, numerals 1902 and 1903 denote pixels as well.

Referring to FIG. 19, a vertical scan circuit 1904 and a horizontal scan circuit 1905 serve to select and read the optical detection elements (pixels) disposed in the pixel area 1900.

Figure 20:
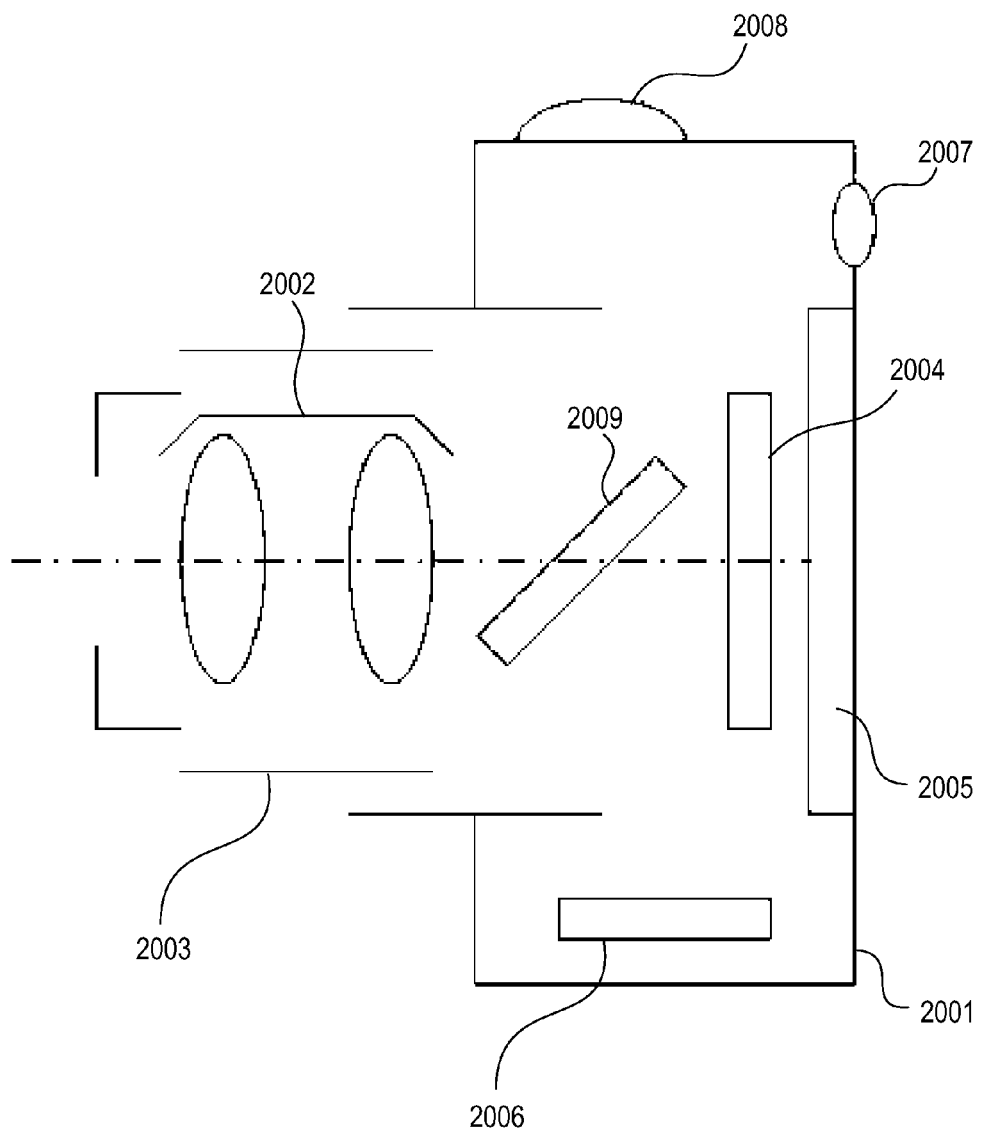
FIG. 20 is a schematic diagram of Example 4.

FIG. 20 is a schematic diagram of a digital camera incorporating the image pickup element configured as shown in FIG. 19.

In FIG. 20, the reference numeral 2001 stands for a camera body, 2007—an eye lens, 2008—a shutter, and 2009—a mirror.

The image pickup element according to the invention is denoted by the reference numeral 2004, and the light falls on the image pickup element 2004 via a pickup optical system (lens) 2002 disposed inside a lens barrel 2003.

As a result, an electric charge is generated in each pixel of the image pickup element 2004 correspondingly to a pickup object, and the pickup object can be reproduced correspondingly to the generated charges. The pickup object can be reproduced at a monitor display device 2005 or recorded on a recording medium 2006 such as a memory card.

Because the thickness of the optical filter in accordance with the invention is less than that of a typical color filter configured by colorants, the image pickup element in accordance with the invention that is shown herein can be configured to have a small thickness. As a result, the distance from the surface of the image pickup element to the photoelectric conversion portion of the image pickup element is decreased and, therefore, light utilization efficiency is increased. As a consequence, sensitivity of the image pickup element in accordance with the invention can be increased.

Example 5

Figure 21:
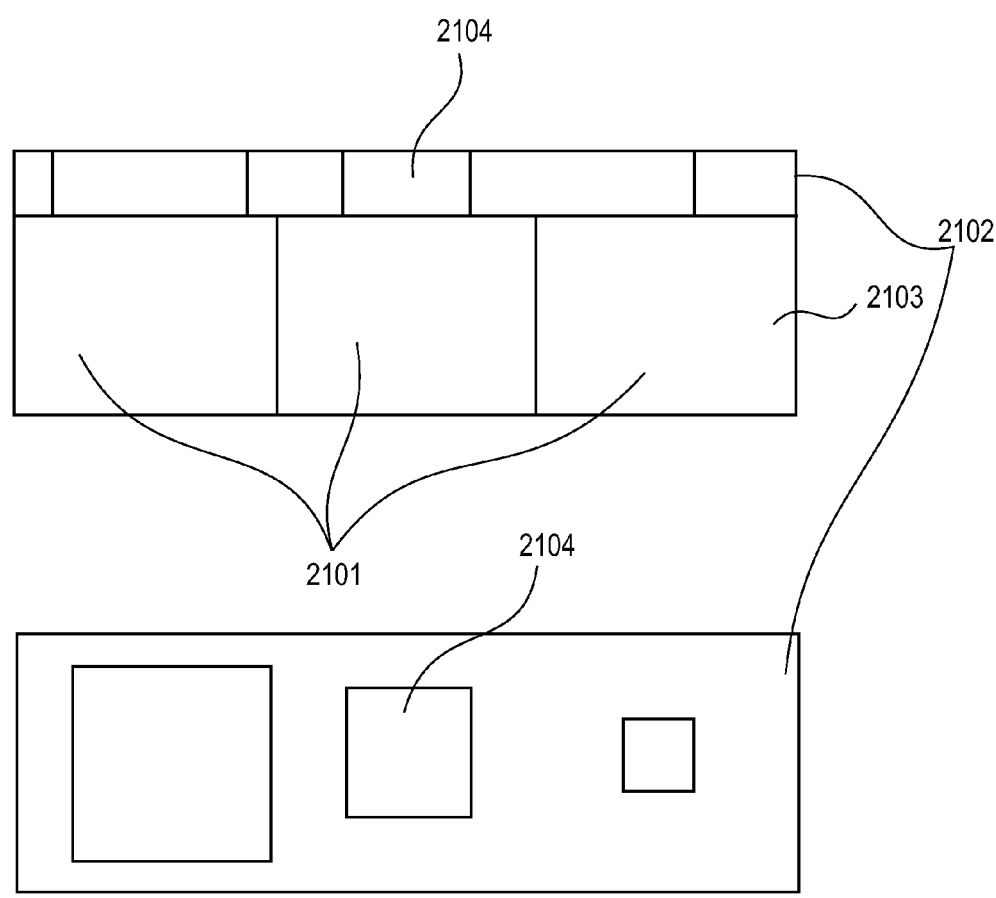
FIG. 21 is a schematic diagram of Example 5.

A spectral element using any of the optical filters explained in Examples 1 to 3 will be described below with reference to FIG. 21.

An optical filter layer 2102 is disposed on a line sensor 2103 having a photoelectric conversion layer 2101 arranged thereon in a one-dimensional fashion. The optical filter layer 2102 has apertures 2104 that differ in size or shape correspondingly to pixels located in the line sensor. Where the size or shape of the apertures 2104 is different, the transmissivity spectrum shapes of apertures will also be different. As a result, for example, where the apertures differ in size, the wavelength at which the light reception efficiency in each pixel of the element of the present example is the highest will differ among the pixels. Therefore, by providing the optical filter layer having the above-described structure on a line sensor, the element of the present example can configure a spectral detector that combines a spectral function and a light detection function.

With the structure in which the optical filter layer is disposed directly on the light sensor, as in the present example, it is possible to miniaturize the spectral element.

Figure 22:
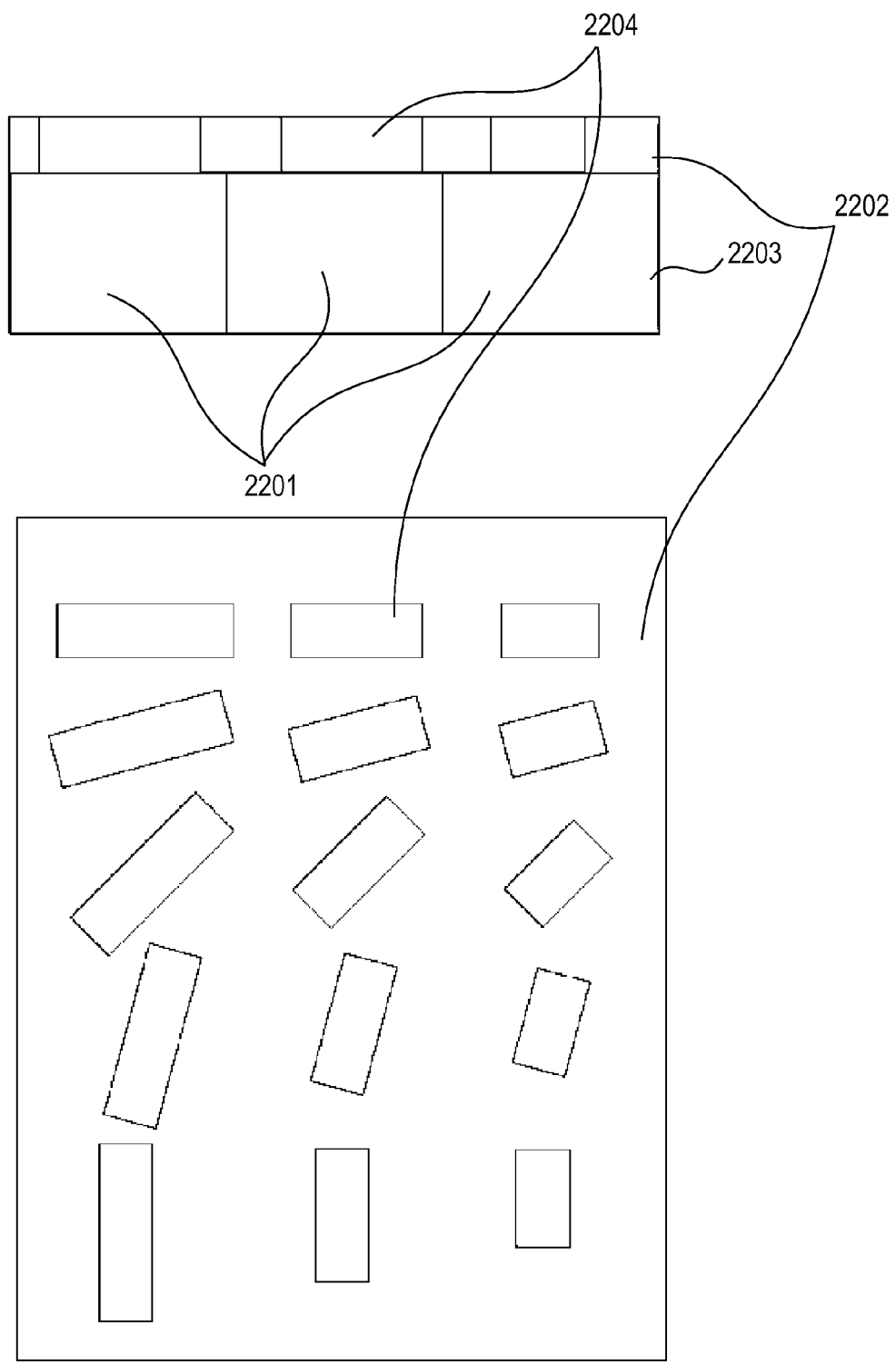
FIG. 22 is a schematic diagram of Example 5.

In this example, a sensor of a one-dimensional structure is configured by arranging the optical filter on a line sensor, but an optical filter layer may be also disposed on a two-dimensional area sensor, as shown for example in FIG. 22.

An optical filter layer 2202 is disposed on an area sensor 2203 in which a photoelectric conversion layer 2201 is arranged in a two-dimensional fashion. The optical filter layer 2202 has apertures 2204 that differ in size or shape correspondingly to pixels located in the areas sensor. Where the size or shape of apertures 2204 are different, the transmissivity spectra of apertures and dependence thereof on polarization will be also different. As a result, by using rectangular apertures such as shown in FIG. 22, it may be possible to impart the transmission spectrum with dependence on polarization. In this case, rectangular apertures with different angular orientations can be disposed in the plane, as shown in FIG. 22, so that the apertures will differ in an angle formed by a longitudinal direction of rectangular aperture and incident light polarization. Furthermore, where the apertures differ in size, in addition to the incident light polarization, the polarization and wavelength at which the light reception efficiency is the highest will differ among the pixels of the element of the present example. Therefore, in a case where the optical filter layer having the above-described structure is provided on the area sensor, the element of the present example can configure a spectral polarization detector that combines a spectral function and a polarization detection function. With the element of the present example, it is possible to produce a small-size element that can acquire light spectrum information and polarization information at the same time.

The invention can thus be applied not only to an optical filter, but also to various devices using the same.

Accordingly, the examples according to the present invention demonstrate that a high-endurance optical filter can be provided that has a relatively high transmissivity in a visible light region, and that can demonstrate substantially stable characteristics over a relatively long period of time. Furthermore, the examples demonstrate that it is possible to provide an optical filter with a small film thickness in which the transmission spectrum has a primary color characteristic.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-142939, filed May 30, 2008, which is hereby incorporated by reference herein in its entirety.

What is claimed is:

1. An optical filter comprising:
   a substrate; and
   a metal layer provided with a plurality of apertures on the substrate surface that selectively transmits light of a first wavelength,
   wherein a size of the apertures is a size equal to or less than the first wavelength, and a ratio of a surface area of the metal layer to a surface area of the substrate surface is within a range of equal to or greater than 36% and equal to or less than 74%, and
   wherein a transmissivity of the first wavelength is increased by localized plasmon resonance induced by light falling on the metal layer.

2. The optical filter according to claim 1, wherein the first wavelength is in a visible range.

3. The optical filter according to claim 1, wherein the apertures are of round or regular polygonal shape.

4. The optical filter according to claim 1, wherein a thickness of the conductive layer is equal to or less than a wavelength of light in a visible range.

5. The optical filter according to claim 1, wherein the conductive layer comprises Al or an alloy or a compound including Al.

6. The optical filter according to claim 1, wherein the substrate comprises a dielectric.

7. The optical filter according to claim 6, wherein the dielectric comprises any one or more of silicon dioxide, titanium dioxide, and silicon nitride.

8. The optical filter according to claim 1, wherein a diameter of the aperture is within a range of equal to or greater than 220 nm and equal to or less than 270 nm, a thickness is within a range of equal to or greater than 10 nm and equal to or less than 200 nm, an arrangement period is within a range of equal to or greater than 310 nm and equal to or less than 450 nm, and a maximum value of a transmission spectrum is demonstrated within a wavelength range of equal to or greater than 600 nm and equal to or less than 700 nm.

9. The optical filter according to claim 1, wherein a diameter of the aperture is within a range of equal to or greater than 180 nm and equal to or less than 220 nm, a thickness is within a range of equal to or greater than 10 nm and equal to or less than 200 nm, an arrangement period is within a range of equal to or greater than 250 nm and equal to or less than 310 nm, and a maximum value of a transmission spectrum is demonstrated within a wavelength range of equal to or greater than 500 nm and equal to or less than 600 nm.

10. The optical filter according to claim 1, wherein a diameter of the aperture is within a range of equal to or greater than 100 nm and equal to or less than 180 nm, a thickness is within a range of equal to or greater than 10 nm and equal to or less than 200 nm, an arrangement period is within a range of equal to or greater than 170 nm and equal to or less than 250 nm, and a maximum value of a transmission spectrum is demonstrated within a wavelength range of equal to or greater than 400 nm and equal to or less than 500 nm.

11. The optical filter according to claim 1, wherein the apertures are arranged with a plurality of periods in the in-plane direction of the substrate.

12. The optical filter according to claim 1, wherein a plurality of metal layers are disposed on the substrate.

13. A light detection element having the optical filter according to claim 1.

14. An image pick-up element having the light detection element according to claim 13.

15. A camera having the image pick-up element according to claim 14.

16. A spectral element having the optical filter according to claim 1.

17. The optical filter according to claim 1, wherein the apertures are arranged in grid-like pattern.

18. The optical filter according to claim 1, wherein a wavelength of the localized plasmon is based on the size of the apertures.

* * * * *